(12) United States Patent
Hasama

(10) Patent No.: US 11,842,089 B2
(45) Date of Patent: Dec. 12, 2023

(54) INFORMATION PROCESSING APPARATUS, CONTROL METHOD OF INFORMATION PROCESSING APPARATUS, AND STORAGE MEDIUM FOR SETTING A SETTING VALUE OF A PRINT SETTING

(71) Applicant: CANON KABUSHIKI KAISHA, Tokyo (JP)

(72) Inventor: Yuichi Hasama, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/700,222

(22) Filed: Mar. 21, 2022

(65) Prior Publication Data

US 2022/0308803 A1 Sep. 29, 2022

(30) Foreign Application Priority Data

Mar. 26, 2021 (JP) .................................. 2021-052906

(51) Int. Cl.
*G06F 3/12* (2006.01)
(52) U.S. Cl.
CPC .......... *G06F 3/1205* (2013.01); *G06F 3/1204* (2013.01); *G06F 3/1258* (2013.01); *G06F 3/1292* (2013.01)

(58) Field of Classification Search
None
See application file for complete search history.

(56) References Cited

U.S. PATENT DOCUMENTS

2020/0089440 A1* 3/2020 Takeo .................. G06F 3/1205

FOREIGN PATENT DOCUMENTS

| EP | 2453349 A2 | 5/2012 |
|---|---|---|
| JP | 2013238924 A | 11/2013 |
| JP | 2014203391 A | 10/2014 |
| JP | 2020009420 A | 1/2020 |

* cited by examiner

*Primary Examiner* — Andrew H Lam
(74) *Attorney, Agent, or Firm* — Canon U.S.A., Inc. IP Division

(57) ABSTRACT

An information processing apparatus that transmits print data to a server in which information regarding an image forming apparatus is registered in accordance with a registration request from the image forming apparatus, and includes an installed application that sets a setting value included in the print data, the information processing apparatus includes a display unit configured to display a print setting screen provided by the application, a reception unit configured to receive an instruction to set a setting value of a setting item, via the print setting screen, and a determination unit configured to determine whether a conflict occurs between the setting value of the setting item set in accordance with the received instruction and a setting value of a different setting item, based on constraint information acquired from an external apparatus.

15 Claims, 18 Drawing Sheets

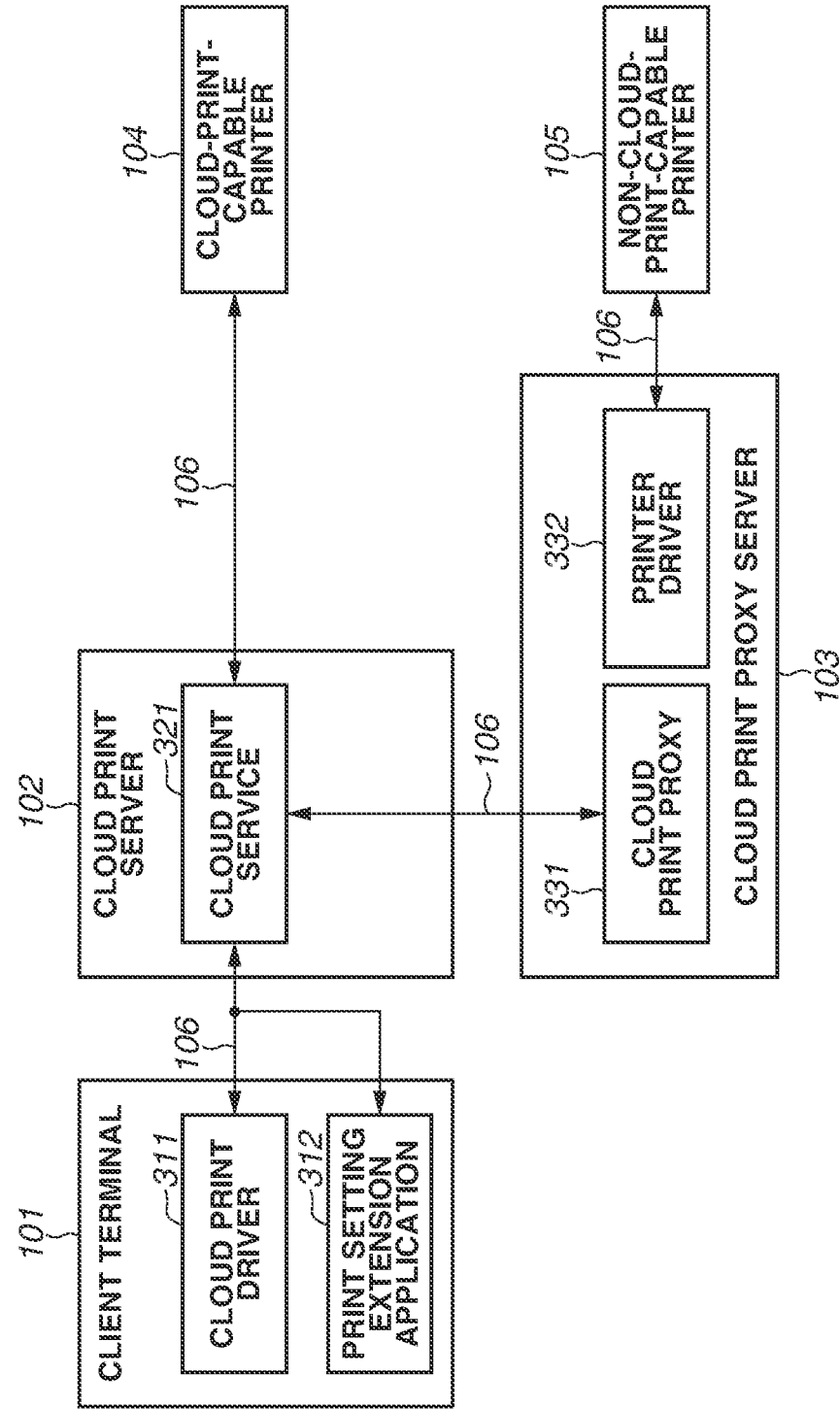

FIG.5A

500
- OUTPUT SHEET SIZE: A4 ▼ — 501
- ORIENTATION OF PRINTING: PORTRAIT ▼ — 502
- SHEET TYPE: PLAIN PAPER ▼ — 503
- TWO-SIDED PRINTING: APPLY (LONG-EDGE BINDING) ▼ — 504
- STAPLING: APPLY (2 LEFT POINTS) ▼ — 505
- OK — 506

FIG.5B

510
- OUTPUT SHEET SIZE: A4 ▼
- ORIENTATION OF PRINTING: PORTRAIT ▼
- SHEET TYPE: TRANSPARENCY ▼
- TWO-SIDED PRINTING: APPLY (LONG-EDGE BINDING) ▼
- STAPLING: APPLY (2 LEFT POINTS) ▼
- OK

FIG.5C

520
- OUTPUT SHEET SIZE: A4 ▼
- ORIENTATION OF PRINTING: PORTRAIT ▼
- SHEET TYPE: PLAIN PAPER ▼
- TWO-SIDED PRINTING: NOT APPLY ▼
- STAPLING: APPLY (2 LEFT POINTS) ▼
- OK

FIG.6A

| DEVICE INFORMATION |
|---|
| DEVICE ID |
| TENANT ID |
| PRINTER NAME |
| DEVICE CONFIGURATION INFORMATION |
| CAPABILITY INFORMATION |
| CONSTRAINT INFORMATION |

FIG.6B

| PRINT QUEUE INFORMATION |
|---|
| PRINT QUEUE NAME |
| DEVICE CONFIGURATION INFORMATION |
| CAPABILITY INFORMATION |
| CONSTRAINT INFORMATION |
| CONNECTION CONFIGURATION INFORMATION |
| TENANT ID |

FIG.6C

| INTERCONVERSION INFORMATION (FROM PRINTER DRIVER TO CLOUD PRINT SERVICE) |
|---|
| PROXY ID |
| PRINT QUEUE NAME |
| DEVICE CONFIGURATION INFORMATION |
| CAPABILITY INFORMATION |
| CONSTRAINT INFORMATION |

FIG.6D

| INTERCONVERSION INFORMATION (FROM CLOUD PRINT SERVICE TO PRINTER DRIVER) |  |
|---|---|
| PRINT SETTING | ~601 |
| RENDERING DATA | ~602 |

FIG.6E

| DEVICE INFORMATION |
|---|
| DEVICE ID |
| PRINTER NAME |
| DEVICE CONFIGURATION INFORMATION |
| CAPABILITY INFORMATION |
| CONSTRAINT INFORMATION |

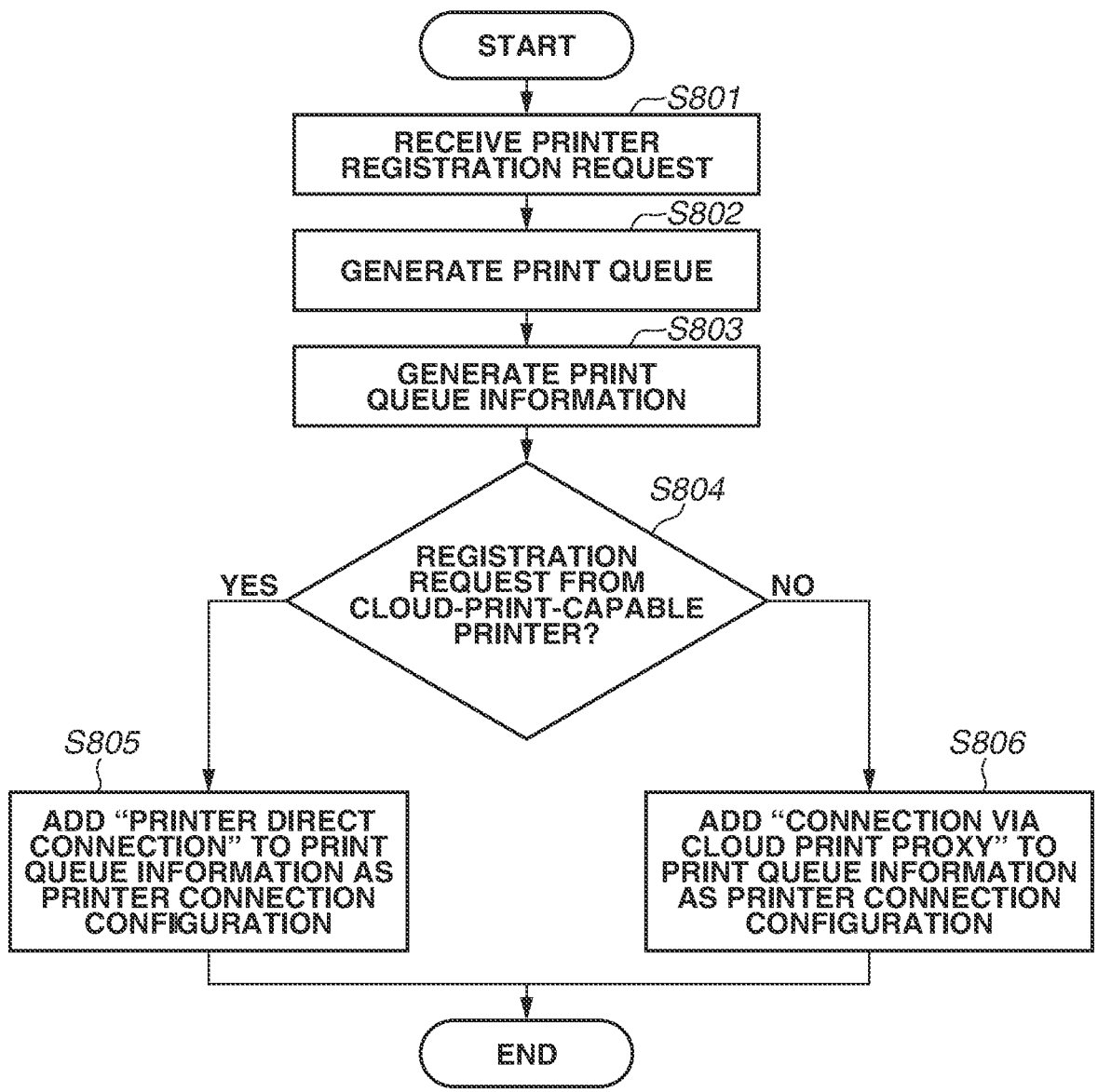

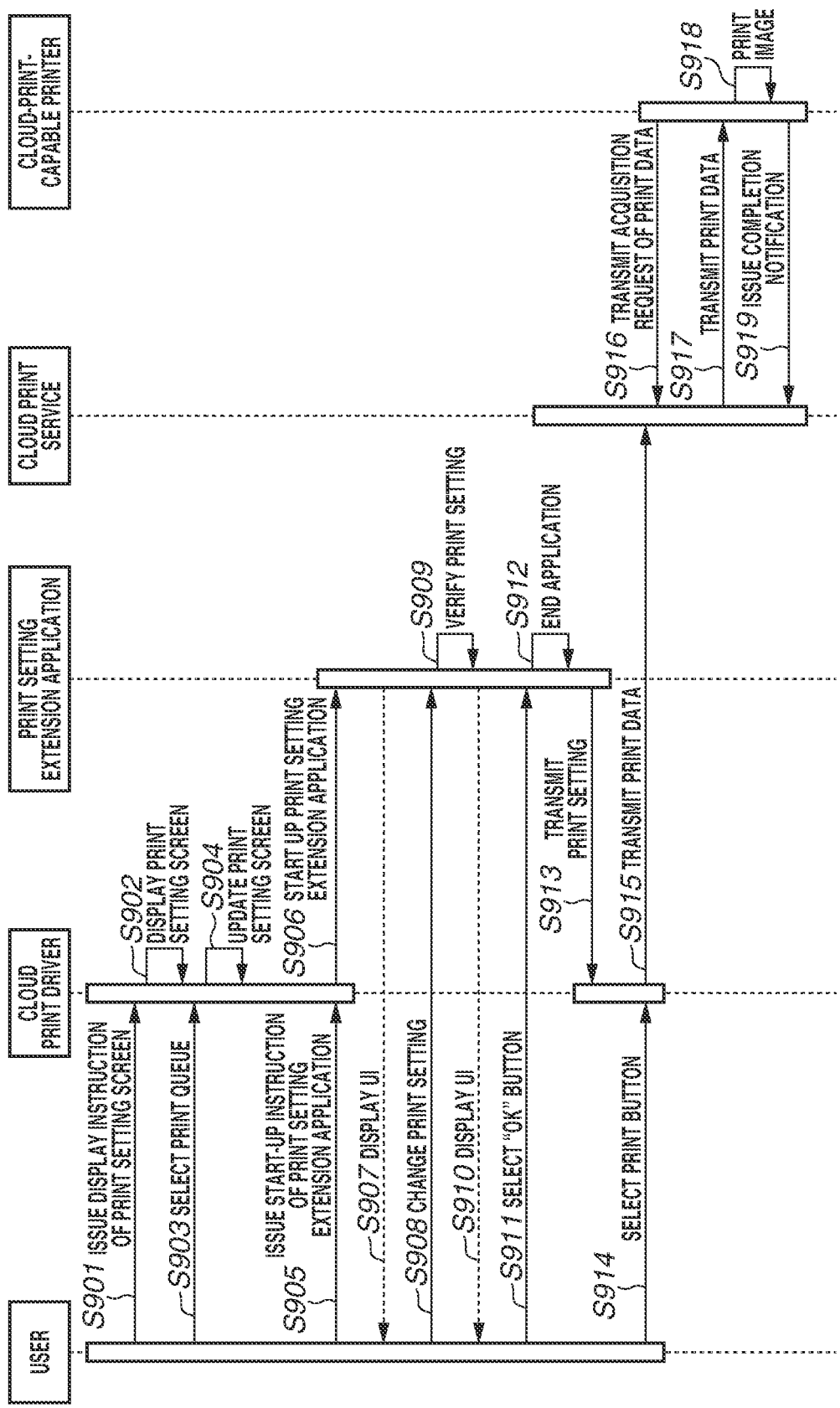

```xml
<?xml version="1.0"?>
<std:PC...>
 ...
```

1351
```xml
<psf:Feature name="psk:DocumentDuplex">
 <psf:Property name="psk:DisplayName">
  <psf:Value xsi:type="xsd:string">TWO-SIDED PRINTING</psf:Value>
 </psf:Property>
 <psf:Property name="psf:SelectionType">
  <psf:Value xsi:type="xsd:QName">psk:PickOne</psf:Value>
 </psf:Property>
 <psf:Option name="psk:OneSided" constrained="psk:None">
  <psf:Property name="psk:DisplayName">
    <psf:Value xsi:type="xsd:string">NOT APPLY</psf:Value>
  </psf:Property>
  <psf:Property name="psf:IdentityOption">
    <psf:Value xsi:type="xsd:string">True</psf:Value>
  </psf:Property>
 </psf:Option>
 <psf:Option name="psk:TwoSidedLongEdge" constrained="psk:None">
  <psf:Property name="psk:DisplayName">
    <psf:Value xsi:type="xsd:string">LONG-EDGE BINDING</psf:Value>
  </psf:Property>
 </psf:Option>
 <psf:Option name="psk:TwoSidedShortEdge" constrained="psk:None">
  <psf:Property name="psk:DisplayName">
    <psf:Value xsi:type="xsd:string">SHORT-EDGE BINDING</psf:Value>
  </psf:Property>
 </psf:Option>
</psf:Feature>
 ...
```

1352
```xml
<psf:Feature name="psk:PageMediaType">
 <psf:Property name="psk:DisplayName">
  <psf:Value xsi:type="xsd:string">SHEET TYPE</psf:Value>
 </psf:Property>
 <psf:Property name="psf:SelectionType">
  <psf:Value xsi:type="xsd:QName">psk:PickOne</psf:Value>
 </psf:Property>
 <psf:Option name="psk:Plain" constrained="psk:None">
  <psf:Property name="psk:DisplayName">
    <psf:Value xsi:type="xsd:string">PLAIN PAPER</psf:Value>
  </psf:Property>
 </psf:Option>
  ...
 <psf:Option name="psk:Transparency" constrained="psk:None">
  <psf:Property name="psk:DisplayName">
    <psf:Value xsi:type="xsd:string">TRANSPARENCY</psf:Value>
  </psf:Property>
 </psf:Option>
 ...
</std:PC>
```

# INFORMATION PROCESSING APPARATUS, CONTROL METHOD OF INFORMATION PROCESSING APPARATUS, AND STORAGE MEDIUM FOR SETTING A SETTING VALUE OF A PRINT SETTING

BACKGROUND OF THE INVENTION

Field of the Invention

The present invention relates to an information processing apparatus, a control method of an information processing apparatus, and a storage medium.

Description of the Related Art

There has been known a printing system in which a user registers information regarding printers, into a cloud print service, transmits print data to a printer via the cloud print service, and executes printing based on the print data. The user accesses the cloud print service from an information processing apparatus, such as a personal computer (PC), selects a printer to be used in printing from among the printers registered in the cloud print service, and issues a printing instruction of print data.

The information processing apparatus generates a print job and inputs the print job to a print queue corresponding to the selected printer on the cloud print service. According to the Japanese Patent Application Laid to Open No. 2013-238924, a printer accesses a cloud print service, acquires a print job spooled in a print queue generated on the cloud print service, and Outputs the print job.

Representative examples of the cloud print service include Google Cloud Print (registered trademark), Microsoft Hybrid Cloud Print (registered trademark), and uniFLOW Online (registered trademark).

In a print setting on a client terminal, the user can set setting values of a plurality of setting items, such as a selection of a sheet type, an image quality setting, and the setting of finishing processing. Among the plurality of setting values, there can be a combination of setting values that cannot be simultaneously applied to one print job. Such a combination of setting values that cannot be simultaneously set to one print job is called a "constraint".

In the use of the cloud print service, a driver for a cloud print service that is compatible with printers of a plurality of types is used. The driver for the cloud print service does not determine whether a current print setting includes setting values matching a constraint, based on the constraint. Consequently, a print job generated by the driver for the cloud print service might include setting values matching the constraint.

SUMMARY OF THE INVENTION

According to an aspect of the present invention, an information processing apparatus that transmits print data to a server in which information regarding an image forming apparatus is registered in accordance with a registration request from the image forming apparatus, and includes an installed application that sets a setting value included in the print data, the information processing apparatus includes a display unit configured to display a print setting screen provided by the application, a reception unit configured to receive an instruction to set a setting value of a setting item, via the print setting screen, and a determination unit configured to determine whether a conflict occurs between the setting value of the setting item set in accordance with the received instruction and a setting value of a different setting item, based on constraint information acquired from an external apparatus.

Further features of the present invention will become apparent from the following description of exemplary embodiments with reference to the attached drawings.

BRIEF DESCRIPTION OF THE DRAWINGS

FIG. 1 is a diagram illustrating an example of a system configuration according to an exemplary embodiment described in this specification.

FIGS. 5A to 5C are diagrams each illustrating an example of an extended print setting screen according to an exemplary embodiment described in this specification.

FIGS. 6A to 6E are diagrams each illustrating an example of a data structure according to an exemplary embodiment described in this specification.

FIG. 8 is a flowchart illustrating processing that is performed when a cloud print service generates a print queue, according to an exemplary embodiment described in this specification.

FIG. 9 is a sequence diagram illustrating processing up to execution of printing using a cloud-print-capable printer, according to an exemplary embodiment described in this specification.

FIGS. 13A and 13B are diagrams each illustrating an example of constraint information according to an exemplary embodiment described in this specification.

DESCRIPTION OF THE EMBODIMENTS

Figure 2A:
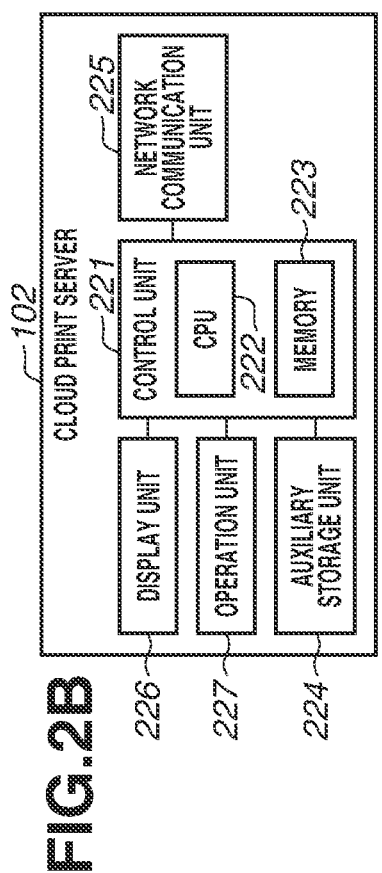
FIGS. 2A to 2E are diagrams each illustrating an example of a hardware configuration of apparatuses according to an exemplary embodiment described in this specification.

Hereinafter, exemplary embodiments of the present invention will be described with reference to the drawings.

FIG. 1 is a configuration diagram illustrating a printing system in cloud print according to a first exemplary embodiment. A client terminal 101, a cloud print server 102, a cloud print proxy server 103, a cloud-print-capable printer 104, and a non-cloud-print-capable printer 105 are connected via a network 106.

While FIG. 1 illustrates one client terminal 101, one cloud-print-capable printer 104, and one non-cloud-print-capable printer 105, the number of each of the apparatuses may be more than one.

The cloud print server 102 and the cloud print proxy server 103 may configure a server system including one information processing apparatus, or may configure a server system including a plurality of information processing apparatuses. The use of a plurality of information processing apparatuses allows processing load to be distributed to the plurality of information processing apparatuses. Alternatively, one server may be configured to virtually play a role of each server inside the one server.

While, the network 106 is a wide area network, (WAN) such as the Internet, the network 106 may be a closed environment, such as an intracompany local area network (LAN).

A personal computer (PC), a tablet, or a smartphone operated by the user operates as the client terminal 101. Any application software can be executed on the client terminal 101. A cloud print driver 311 and a print setting extension application 312 are installed on the client terminal 101.

The cloud-print-capable printer 104 and the non-cloud-print-capable printer 105 are devices that actually perform printing onto physical paper, and operate as image forming apparatuses. The cloud-print-capable printer 104 and the non-cloud-print-capable printer 105 receive print data transmitted by the cloud print server 102 via the network 106, convert the print data into image data, and execute printing. The cloud-print-capable printer 104 is a printer that can communicate with the cloud print server 102 by using a predetermined protocol. The predetermined protocol is an internet printing protocol (IPP), for example. The non-cloud-print-capable printer 105 is a printer that cannot perform communication using the predetermined protocol. Thus, in a case where printing via a cloud print service is performed using the non-cloud-print-capable printer 105, the non-cloud-print-capable printer 105 performs communication via the cloud print proxy server 103. The non-cloud-print-capable printer 105 may be a printer simply not supporting a function of the cloud print server 102, and may communicate print data by using the above-described predetermined protocol.

The cloud print server 102 has a role of receiving print data including a print setting and image data, from the client terminal 101, and transmitting the received print data to the cloud-print-capable printer 104 or the cloud print proxy server 103. A cloud print service 321 operates on the cloud print server 102.

The cloud print proxy server 103 communicates with the cloud print server 102 and communicates printer information and print data on behalf of the non-cloud-print-capable printer 105. A cloud print proxy 331 and a printer driver 332 are installed on the cloud print proxy server 103.

Next, a hardware configuration of a system according to the present exemplary embodiment will be described with reference to FIGS. 2A to 2E.

FIG. 2A is a block diagram illustrating a hardware configuration of the client terminal 101. The client terminal 101 includes a display unit 216, an operation unit 217, an auxiliary storage unit 214, a control unit 211, and a network communication unit 215.

The auxiliary storage unit 214 refers to a nonvolatile storage device, such as a hard disk or a solid state drive (SSD), and can store and rewrite digital data.

The control unit 211 includes a central processing unit (CPU) 212 and a memory 213, and controls entire operations of the client terminal 101. The CPU 212 loads a program stored in the auxiliary storage unit 214, onto the memory 213, and executes the program. The memory 213 is a main storage memory of the CPU 212, and is used as a work area or a temporary storage region for loading various programs.

The network communication unit 215 is a device that externally communicates with the network 106, and performs input-output of digital data from and to an external server or client terminal via the network 106.

The display unit 216 is a device, such as a liquid crystal display, for displaying visual information to the user.

The operation unit 217 is a device for receiving entry from the user via a keyboard or a mouse. A device, such as a touch panel, that has functions of both the display unit 216 and the operation unit 217 can alternatively be used.

Figure 2B:
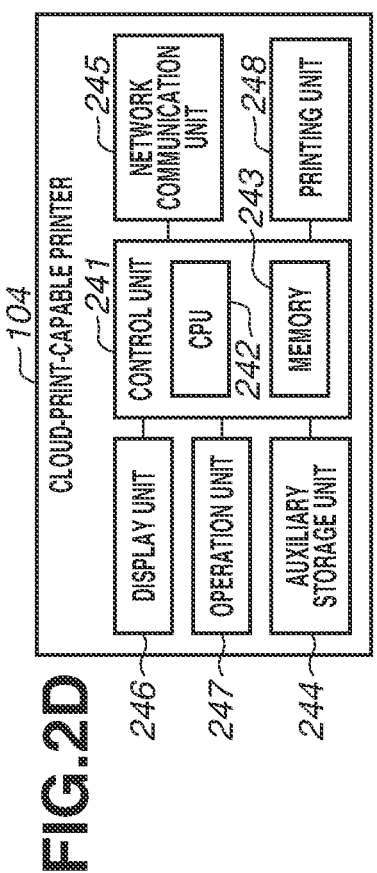

FIG. 2B is a block diagram illustrating a hardware configuration of the cloud print server 102. The cloud print server 102 includes a display unit 226, an operation unit 227, an auxiliary storage unit 224, a control unit 221, and a network communication unit 225. Because the display unit 226, the operation unit 227, the auxiliary storage unit 224, the control unit 221, and the network communication unit 225 are equivalent to those of the client terminal 101, the description thereof will be omitted. While FIG. 2B illustrates one auxiliary storage unit 224, one control unit 221, and one network communication unit 225, the number of each of the units can be one or more.

Figure 2C:
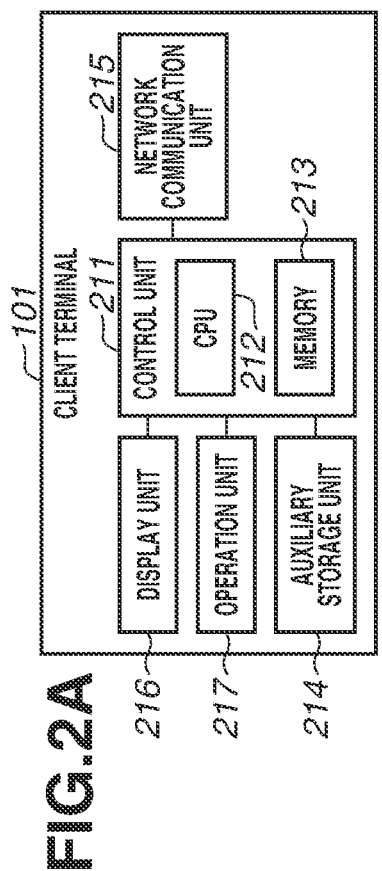

FIG. 2C is a block diagram illustrating a hardware configuration of the cloud print proxy server 103. The cloud print proxy server 103 includes a display unit 236, an operation unit 237, an auxiliary storage unit 234, a control unit 231, and a network communication unit 235. The control unit 231 includes a CPU 232 and a memory 233. Because the display unit 236, the operation unit 237, the auxiliary storage unit 234, the control unit 231, the network communication unit 235, the CPU 232 and the memory 233 are equivalent to those of the client terminal 101, the description thereof will be omitted. FIG. 2C illustrates one display unit 236, one operation unit 237, one auxiliary storage unit 234, one control unit 231, and one network communication unit 235, but the number of each of these units can be more than one.

Figure 2D:
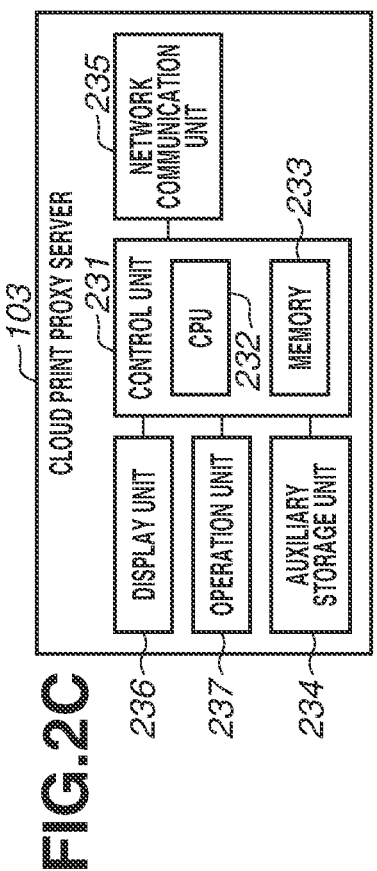

FIG. 2D is a block diagram illustrating a hardware configuration of the cloud-print-capable printer 104. The cloud-print-capable printer 104 includes a display unit 246, an operation unit 247, an auxiliary storage unit 244, a control unit 241, a network communication unit 245, and a printing unit 248. The control unit includes a CPU 242 and a memory 243.

The display unit 246 is a device, such as a touch panel or a light-emitting diode (LED), that is attached to the cloud-print-capable printer 104, for displaying information to the user in real time.

The operation unit 247 is a device for receiving entry from the user, and can include hardware keys, such as a numerical keypad, in addition to a touch panel. Because the auxiliary storage unit 244, the control unit 241, the CPU 242 and the memory 243 are equivalent to those of the client terminal 101, the redundant description will be omitted. The number of auxiliary storage units 244 and the number of control units 241 may be one or more.

The network communication unit 245 is a device that externally communicates with the network 106, and mainly has roles of receiving print data, and transmitting a state of the cloud-print-capable printer 104, such as an error, to an external server.

The printing unit 248 is a device that performs print processing onto sheets prepared in a cassette or a tray, by performing a series of operations including sheet feeding, printing, and sheet discharge. A printing method is not specifically limited, and may be an electrophotographic method or an inkjet method. A two-sided printing unit and a finishing device that are to be used in sheet discharge are also included in the printing unit 248. The finishing device performs stapling and punching processing.

In the present exemplary embodiment, a single-function printer having a single printing function has been described as an example of the cloud-print-capable punter 104, but a multifunction printer (multifunction peripheral) also including a scanner function and a FAX function may be used.

Figure 2E:
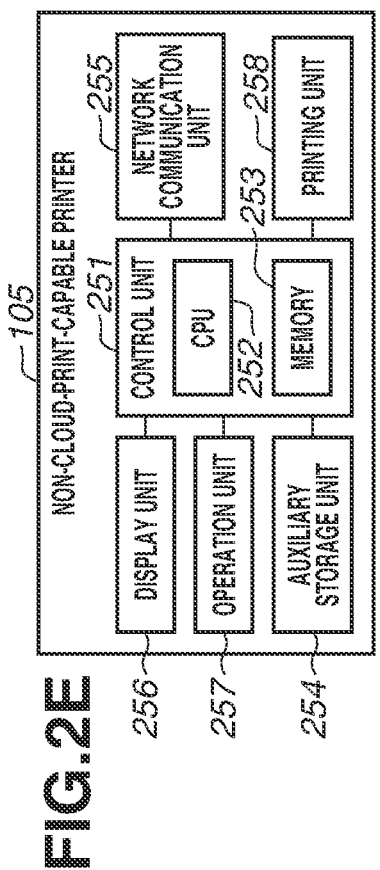

FIG. 2E is a block diagram illustrating a hardware configuration of the non-cloud-print-capable printer 105. The non-cloud-print-capable printer 105 includes a display unit 256, an operation unit 257, an auxiliary storage unit 254, a control unit 251, a network communication unit 255, and a printing unit 258. The control unit 251 includes a CPU 252 and a memory 253.

Because the display unit 256, the operation unit 257, the auxiliary storage unit 254, the control unit 251, the network communication unit 255, the printing unit 258, the CPU 251 and the memory 253 are equivalent to those of the cloud-print-capable printer 104, the redundant description will be omitted.

Next, a software configuration of the system according to the present exemplary embodiment will be described with reference to FIGS. 3A to 3E.

Figure 3C:
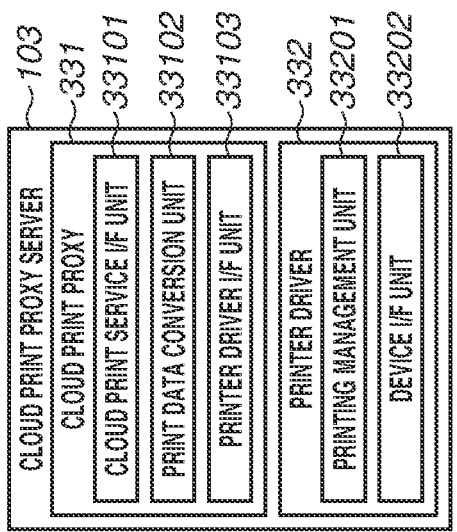
FIGS. 3A to 3E are diagrams each illustrating an example of a software configuration of the apparatuses according to an exemplary embodiment described in this specification.
Figure 3E:
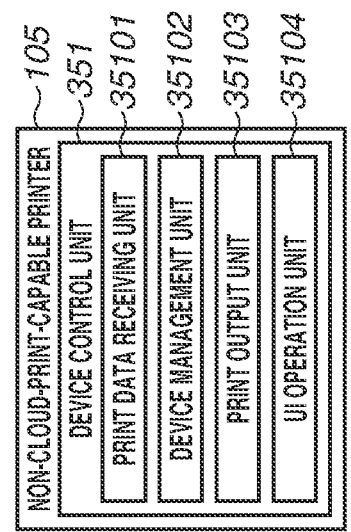
Figure 3B:
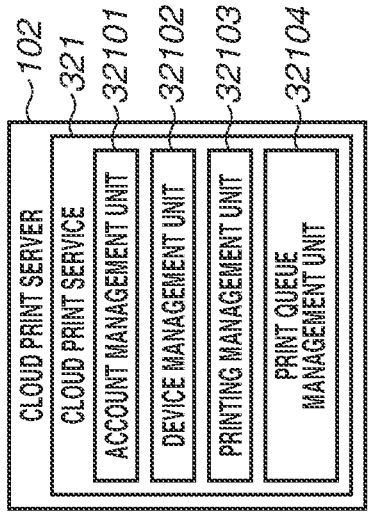
Figure 3D:
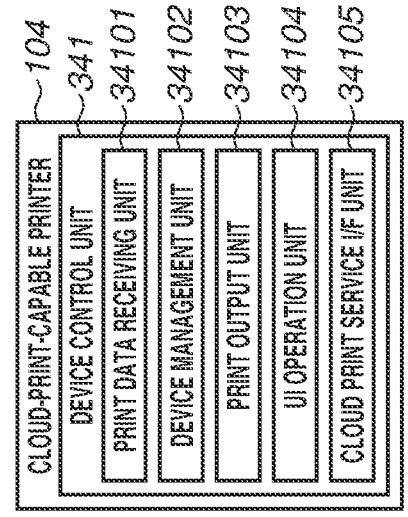
Figure 3A:
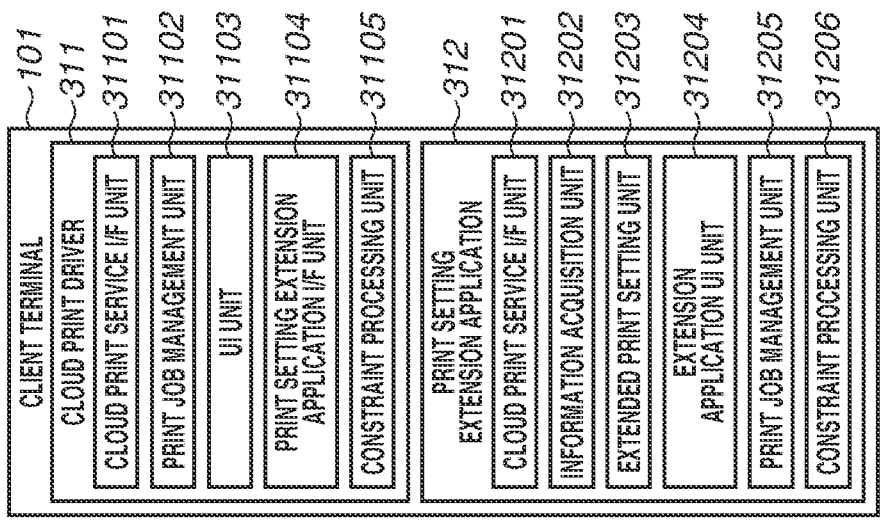

FIG. 3A is a block diagram illustrating a software configuration of the client terminal 101.

The client terminal 101 includes the cloud print driver 311 and the print setting extension application 312. The cloud print driver 311 is software for generating print data to be transmitted to the cloud print server 102. The print setting extension application 312 is an application for extending a function of the cloud print driver 311, and executes processing, such as display control of a print setting screen.

The cloud print driver 311 further includes the following software components.

A cloud print service I/F unit 31101 performs data and command communication processing that is performed with the cloud print service 321.

A print job management unit 31102 performs processing, such as generation of a print job including print data, and transmission of a print job. The print job management unit 31102 generates print data in accordance with a protocol supported by the cloud print service 321, and transmits the print data as a print job. For example, in a case where the cloud print service 321 transmits and receives print data in accordance with the IPP, the print job management unit 31102 generates print data in accordance with the IPP. Similarly, in a file format of image data included in print data, the print job management unit 31102 generates print data in accordance with a file format (e.g., a portable document format (PDF) or printer working group (PWG)-Raster) supported by the cloud print service 321.

Figure 4:
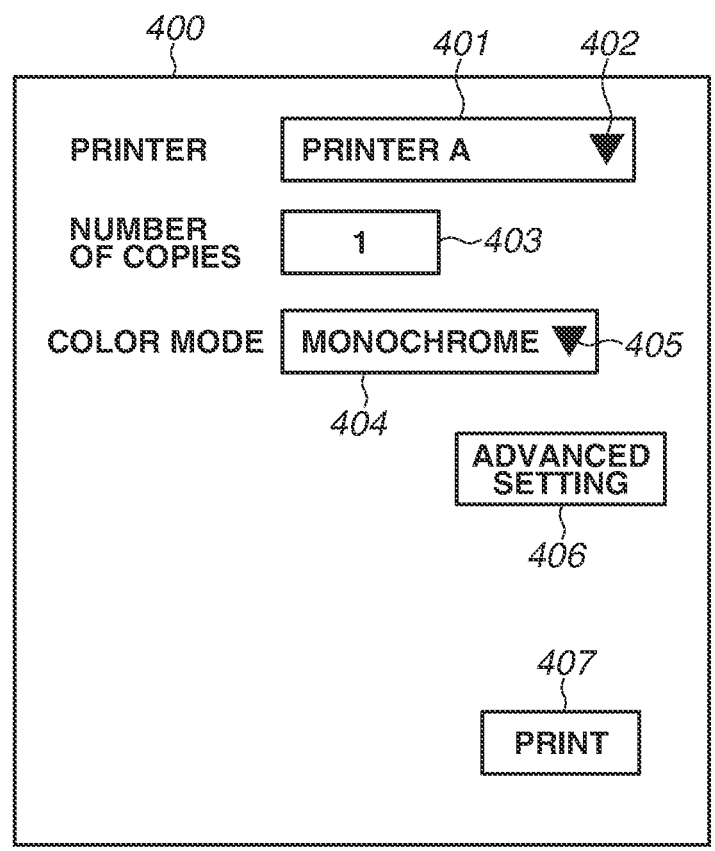
FIG. 4 is a diagram illustrating an example of a print setting screen according to an exemplary embodiment described in this specification.

A user interface (UI) unit 31103 has roles of displaying a UI prepared by the cloud print driver 311, and receiving an operation of the user from the client terminal 101. The UI unit 31103 displays a print setting screen 400 illustrated in FIG. 4. On the print setting screen 400, objects for use in printing using the cloud print service 321 are arranged. In a region 401 illustrated in FIG. 4, information regarding a print queue registered in the cloud print server 102 is displayed. A button 402 is a button for displaying a list of print queues registered in the cloud print server 102. The user selects a print queue corresponding to a printer to be used in printing, from among print queues displayed by the selection of the button 402. A region 403 is a region for setting the number of copies to be printed. A region 404 is a region for setting a color mode. A button 405 is a button for changing a color mode. The user can select a color mode to be set in printing, after selecting the button 405. An advanced setting button 406 is a button for starting up the print setting extension application 312. A print button 407 is a button for transmitting a printing instruction to the cloud print server 102. In a case where the user selects the print button 407, the print job management unit 31102 generates a print job. The generated print job is transmitted to the cloud print service 321 via the cloud print service I/F unit 31101.

In the present exemplary embodiment, the cloud print driver 311 includes the UI unit 31103 and displays the print setting screen 400. An operating system (OS) of the client terminal 101 or an application installed on the client terminal 101 may include a UI unit and display the print setting screen 400. In such a case, in addition to print queues registered in the cloud print server 102, a print queue of which print data can be directly transmitted by the client terminal 101 is displayed in the region 401. In a case where a print queue of which print data can be directly transmitted by the client terminal 101 is selected, the client terminal 101 generates print data by using a printer driver corresponding to the selected print queue. The generated print data is directly transmitted to a printer, instead of being transmitted via the cloud print server 102.

A print setting extension application I/F unit 31104 performs data and command communication processing with the print setting extension application 312.

A constraint processing unit 31105 executes constraint processing on a print setting set on the UI unit 31103, based on constraint information acquired from the cloud print service 321. In a case where a print setting set on the UI unit 31103 includes a setting matching a constraint, the constraint processing unit 31105 determines that a conflict with the constraint occurs, changes the print setting to a print setting in which a conflict with the constraint does not occur, and displays the changed print setting on the UI unit 31103. In a case where a print setting set on the UI unit 31103 does not include a setting matching a constraint, the constraint processing unit 31105 determines that a conflict with the constraint does not occur. The constraint processing unit 31105 determines whether the print setting includes a setting matching a constraint, at a timing of when a print selling is changed on a print selling screen displayed by the UI unit 31103.

The print setting extension application 312 further includes the following software components.

A cloud print service I/F unit 31201 performs data and command communication processing with the cloud print service 321. The cloud print service I/F unit 31201 acquires information regarding a printer and a print setting that are set on the print setting screen 400, from the print setting extension application OF unit 31104 of the cloud print driver 311. The cloud print service I/F unit 31201 also has a role of delivering a print setting set by the print setting extension application 31210 the cloud print driver 311.

An information acquisition unit 31202 acquires information, such as print queue information, from the cloud print service 321.

An extended print setting unit 31203 manages print settings including a print setting unique to a printer vendor that is not supported by the cloud print driver 311.

An extension application UI unit 31204 has roles of displaying a UI prepared by the print setting extension application 312, and receiving an operation of the user from the client terminal 101. FIG. 5A illustrates an example of a print setting UI that is displayed by the extension application UI unit 31204 of the print setting extension application 312. An extended prim setting screen 500 is a screen that is displayed in response to the user selecting the advanced setting button 406 on the print setting screen 400. On the extended print setting screen 500, a print setting that is not available on the print setting screen 400 can be set. For example, a region 501 is a region indicating a size of a sheet to be output, a region 502 is a region indicating the orientation of printing, and a region 503 is a region indicating a sheet type. The regions 501, 502, and 503 respectively indicate that a sheet size is set to "A4", the orientation of printing is set to "portrait", and a sheet type is set to "plain paper". A region 504 is a region for a setting of two-sided printing, and "APPLY (LONG-EDGE BINDING)" means that two-sided printing with a binding position set to a long side is to be performed. A region 505 is a region for a setting of stapling, and "APPLY (2 LEFT POINTS)" means that two points on the left side of a sheet are to be stapled. In a case where the user selects an "OK" button 506, the extended print setting screen 500 is closed and the print setting screen 400 is displayed.

In the present exemplary embodiment, the extended print setting screen 500 displays setting items that are not available on the print setting screen 400. Selling items that are available on the print setting screen 400 may also be displayed on the extended print setting screen 500, and the setting of these setting items may be configured to be changeable.

A print job management unit 3205 performs processing including generation of a print job, editing of a print job generated by the cloud print driver 311, transmission of a print job, and the like. The print job management unit 31205 of the print setting extension application 312 can edit a print job generated by the print job management unit 31102 of the cloud print driver 311.

A constraint processing unit 31206 executes constraint processing on a print setting set on the extension application UI unit 31204, based on constraint information acquired from the cloud print service 321.

The constraint processing unit 31206 determines whether a print setting set on the extension application UI unit 31204 includes a setting matching a constraint included in the constraint information. In a case where the print setting includes a setting value matching a constraint, the constraint processing unit 31206 changes the setting value to a value at which a conflict with the constraint does not occur, and displays the changed setting value on the extension application UI unit 31204. In a case where a print setting set on the extension application UI unit 31204 does not include a setting matching a constraint, the constraint processing unit 31206 determines that a conflict with a constraint does not occur.

FIG. 3B is a block diagram illustrating a software configuration of the cloud print service 321 operating on the cloud print server 102.

An account management unit 32101 manages authentication of tenants and users registered in the cloud print service 321. A tenant is a group to which one user or a plurality of users belong. The account management unit 32101 manages a user ID of each user and information, such as a password, that is necessary for authentication, in association with each other. The account management unit 32101 further manages a user ID and a tenant ID of a tenant to which a user belongs, in association with each other.

A device management unit 32102 manages information regarding a printer registered in the cloud print service 321. Device information is registered into the device management unit 32102 in response to a registration request receiving from a printer. FIG. 6A illustrates an example of device information registered in the device management unit 32102. A device ID is identification information unique to a printer, and is also called a hardware ID. A tenant ID is identification information of a tenant that can use the device. A printer name is a name of the device that is notified from the printer.

Device configuration information is configuration information of a printer, and is information indicating whether a finisher that performs postprocessing, such as stapling and punching, is connected to the printer, or information indicating whether a unit for performing two-sided printing is connected to the printer. Capability information is information indicating a function executable by a printer. The capability information includes information indicating whether color printing is executable, information indicating whether two-sided printing is executable, information regarding a position at which stapling is executable, information regarding a usable punch hole, and information indicating whether a secure print function is usable. Constraint information is information indicating a combination of conflicting setting values of print settings that cannot be simultaneously executed by a printer. In the case of a printer that cannot execute "two-sided printing" on a sheet type "transparency", for example, the constraint information includes information indicating that "transparency" and "two-sided printing" cannot be simultaneously set.

A printing management unit 32103 determines whether to permit a print job delivery request from the cloud-print-capable printer 104 or the cloud print proxy server 103, and manages the delivery of a print job.

A print queue management unit 32104 receives a print job from the outside, and stores the received print job into a region prepared in the auxiliary storage unit 224 of the cloud print server 102. The print queue management unit 32104 manages print queue information illustrated in FIG. 6B. The print queue information includes a print queue name, device configuration information, capability information, connection configuration information, a tenant ID, and constraint information. The print queue name is a name of the print queue, and is a name that is displayed on the print setting screen 400. The device configuration information, the capability information, and the constraint information are information pieces similar to those included in the device information illustrated in FIG. 6A. The connection configuration information is information indicating whether the print queue is a queue of which print data is transmitted to a printer not via the cloud print proxy server 103, or a queue of which print data is transmitted to the cloud print proxy server 103. A tenant ID is identification information of a tenant that can use the print queue. The device information illustrated in FIG. 6A and the print queue information illustrated in FIG. 613 are associated with each other based on the tenant ID.

FIG. 3C is a block diagram illustrating a software configuration of the cloud print proxy server 103. The cloud print proxy server 103 includes the cloud prim proxy 331 and the printer driver 332.

The cloud print proxy 331 further includes the following software components.

A cloud print service I/F unit 33101 performs data and command communication processing that is performed with the cloud print service 321.

A print data conversion unit 33102 converts data exchanged between the cloud print service 321 and the printer driver 332, as necessary.

A printer driver I/F unit 33103 performs data and command communication processing that is performed with the printer driver 332.

The printer driver 332 includes the following software components.

A printing management unit 33201 converts print data including a print setting and rendering data that has been received from the cloud print proxy 331, into a page description language (PDL) processable by a printer, and transmits the converted print data to the printer.

A device IN unit 33202 performs data and command communication processing that is performed between the printer driver 332 and the non-cloud-print-capable printer 105.

The printing management unit 33201 also manages capability information of the non-cloud-print-capable printer 105 that is associated with the printer driver 332. The capability information managed by the priming management unit 33201 is converted by the print data conversion unit 33102 of the cloud print proxy 331 into interconversion information interpretable by the cloud print server 102, and transmitted to the cloud print server 102. FIG. 6C is a diagram illustrating an example of interconversion information generated by the print data conversion unit 33102. The interconversion information includes a proxy ID, a print queue name, device configuration information, capability information, and constraint information. The proxy ID is identification information of the cloud print proxy 331. The print queue name is a name of a print queue associated with the printer driver 332 on the cloud print proxy server 103. The device configuration information is configuration information of the non-cloud-print-capable printer 105 corresponding to the printer driver 332. The capability information is capability information of the non-cloud-print-capable printer 105 corresponding to the printer driver 332. The constraint information is constraint information of the non-cloud-print-capable printer 105 corresponding to the printer driver 332. As described above, in a case where printing is executed via the cloud print proxy server 103, the cloud print server 102 is notified of a proxy ID in place of a device ID.

Interconversion information illustrated in FIG. 6D is an example of print data that is notified from the cloud print server 102 to the print data conversion unit 33102. The interconversion information includes a print setting 601 and rendering data 602. The print data conversion unit 33102 converts the interconversion information illustrated in FIG. 6D, into a format manageable by the printer driver 332, and delivers the converted interconversion information to the printer driver 332.

FIG. 3D is a block diagram illustrating a software configuration of a device control unit 341 of the cloud-print-capable printer 104.

A print data receiving unit 34101 receives print data transmitted from the outside via the network 106, and stores the received print data into the auxiliary storage unit 244 of the cloud-print-capable printer 104. The print data receiving unit 34101 can process print data that can be generated by the cloud print server 102 by using a predetermined protocol.

A device management unit 34102 manages an option connected to the cloud-print-capable printer 104, capability information, a sheet remaining amount, and an ink/toner remaining amount. The device management unit 34102 can generate capability information interpretable by the cloud print server 102.

A print output unit 34103 performs printing onto a sheet.

A UI operation unit 34104 displays a UI on the operation unit 247 of the cloud-print-capable printer 104, and acquires instructions and information entered via the UI.

A cloud print service I/F unit 34105 performs data and command communication processing that is performed with the cloud print service 321.

FIG. 3E is a block diagram illustrating a software configuration of a device control unit 351 of the non-cloud-print-capable printer 105.

A print data receiving unit 35101 receives print data from the device I/F unit 33202 of the printer driver 332. The print data receiving unit 35101 does not support a format of print data transmitted by the cloud print server 102, and cannot interpret the print data. In the present exemplary embodiment, print data transmitted by the cloud print server 102 is converted by the printer driver 332 of the cloud print proxy server 103 into a format processable by the print data receiving unit 35101. Printing can be thereby executed via the cloud print server 102 by using the non-cloud-print-capable printer 105.

A device management unit 35102 manages capability information, a sheet remaining amount, and an ink/toner remaining amount of the non-cloud-print-capable printer 105. The device management unit 35102 manages the above-described information in a format different from the cloud print server 102. Thus, for notifying the cloud print server 102 of capability information of the non-cloud-print-capable printer 105, conversion is to be performed by the cloud print proxy server 103.

Because a print output unit 35103 and a UI operation unit 35104 are equivalent to those of the cloud-print-capable printer 104, the redundant description will be omitted.

Next, an example of a procedure to be performed by the user and a sequence of processing to be performed between each software component and a service in registering the cloud-print-capable printer 104 into the cloud print service 321 according to the present exemplary embodiment will be described below with reference to FIG. 7A.

In step S701, the user issues a printer registration instruction from the operation unit 247 of the cloud-print-capable printer 104.

In step S702, the cloud-print-capable printer 104 displays a login UI for logging into the cloud print service 321, on the operation unit 247.

In step S703, the user enters login information onto the login UI. The login information includes a user ID and a password.

In step S704, the cloud-print-capable printer 104 transmits the entered login information and an authentication request to the cloud print service 321.

In step S705, the cloud print service 321 performs authentication processing based on the login information received together with the authentication request. In a case where the authentication has succeeded, in step S706, the cloud print service 321 issues a token for access, and transmits the token to the cloud-print-capable printer 104. The token is to be used in a case where the cloud-print-capable printer 104 accesses the cloud print service 321 next time or later. In a case where the authentication in step S705 has failed, the processing illustrated in FIG. 7A ends.

In step S707, the cloud-print-capable printer 104 transmits a printer registration request to the cloud print service 321 together with the received token and printer information. The printer information includes a device ID, a printer name, device configuration information, capability information, and constraint information.

In step S708, the cloud print service 321 performs printer registration processing. The details of the printer registration processing executed in step S708 will be described below.

In step S709, after the printer registration processing, the cloud print service 321 returns a registration completion status to the cloud-print-capable printer 104. Then, in step S710, the cloud-print-capable printer 104 displays the registration completion status on the operation unit 247.

As described above, after registering information regarding a printer, into a cloud print service, a user operates a client terminal and generates a print queue for transmitting a print job to a printer registered in the cloud print service. First of all, the user logs into the cloud print service, and acquires information regarding printers usable by the user, from the cloud print service. From the acquired information regarding printers, the user selects information regarding a printer to be used. The client terminal acquires the selected information regarding the printer, from the cloud print service. The information regarding the printer includes a printer name, and a device ID, a company ID (COID), a model name, device configuration information, and constraint information of the printer. The client terminal notifies an external server of the device ID received from the cloud print service, and acquires identification information of a print setting extension application corresponding to a print queue to be generated. In a case where a print setting extension application identified by the identification information acquired from the external server has been installed on the client terminal, the client terminal associates a print queue to be generated, and the print setting extension application. In a case where a print setting extension application identified by the identification information acquired from the external server has not installed on the client terminal, the client terminal accesses a server for application distribution, and installs the print setting extension application. Then, the client terminal associates the installed print setting extension application and a print queue to be generated. With this configuration, in a case where a detailed setting button is selected on a print setting screen displayed by a cloud print driver, a print setting extension application corresponding to a printer is started up. A server for application distribution that distributes a print setting extension application is a server different from a server to which print data is transmitted in printing via a cloud print service.

Next, an example of a procedure to be performed by the user and a sequence of processing to be performed between each software component and a service in registering the non-cloud-print-capable printer 105 into the cloud print service 321 according to the present exemplary embodiment will be described with reference to FIG. 7B. The printer driver 332 is installed on the cloud print proxy server 103, and a print queue corresponding to the non-cloud-print-capable printer 105 has been generated. When a print queue has been generated, the printer driver 332 communicates with the non-cloud-print-capable printer 105, and acquires a hardware ID, a model name, device configuration information, and capability information of the printer.

In step S721, the user selects the printer driver 332 for the non-cloud-print-capable printer 105 to be connected, via the cloud print proxy 331.

In step S722, the cloud print proxy 331 transmits a printer information request to the printer driver 332 selected in step S721. The printer information includes a hardware ID, a model name, device configuration information, settable capability information, and constraint information of a printer.

In step S723, the printer driver 332 returns printer information to the cloud print proxy 331.

In step S724, the cloud print proxy 331 stores the received printer information in association with the printer driver 332.

In step S725, the cloud print proxy 331 activates a printer registration button on a UI, and indicates that printer registration has been activated.

In step S726, the user presses a printer registration button and issues a printer registration instruction.

In step S727, the cloud print proxy 331 displays a login UI for logging into the cloud print service 321, on the UI.

In step S728, the user enters login information onto the login UI.

In step S729, the cloud print proxy 331 transmits an authentication request to the cloud print service 321 together with the entered login information.

In step S730, the cloud print service 321 performs authentication processing. In a case where the authentication has succeeded, in step S731, the cloud print service 321 issues a token for access, and returns the token to the cloud print proxy 331. In a case where the authentication has failed, the processing illustrated in FIG. 7B ends.

In step S732, the cloud print proxy 331 converts a data format of the stored printer information into a format manageable by the cloud print service 321. The format manageable by the cloud print service 321 is a format complying with the IPP, for example.

In step S733, the cloud print proxy 331 transmits a printer registration request to the cloud print service 321 together with the received token and the converted printer information.

In step S734, the cloud print service 321 performs printer registration processing.

The details of the printer registration processing will be described below.

After the printer registration processing, in step S735, the cloud print service 321 returns a registration completion status to the cloud print proxy 331.

Then, in step S736, the cloud print proxy 331 displays the registration completion status on the UI.

Similar to the cloud-print-capable printer, for a non-cloud-print-capable printer, after registering information regarding a printer, into a cloud print service, a user operates a client terminal and generates a print queue.

Because the processing is similar to that of the cloud-print-capable printer, the redundant description will be omitted.

Figure 7A:
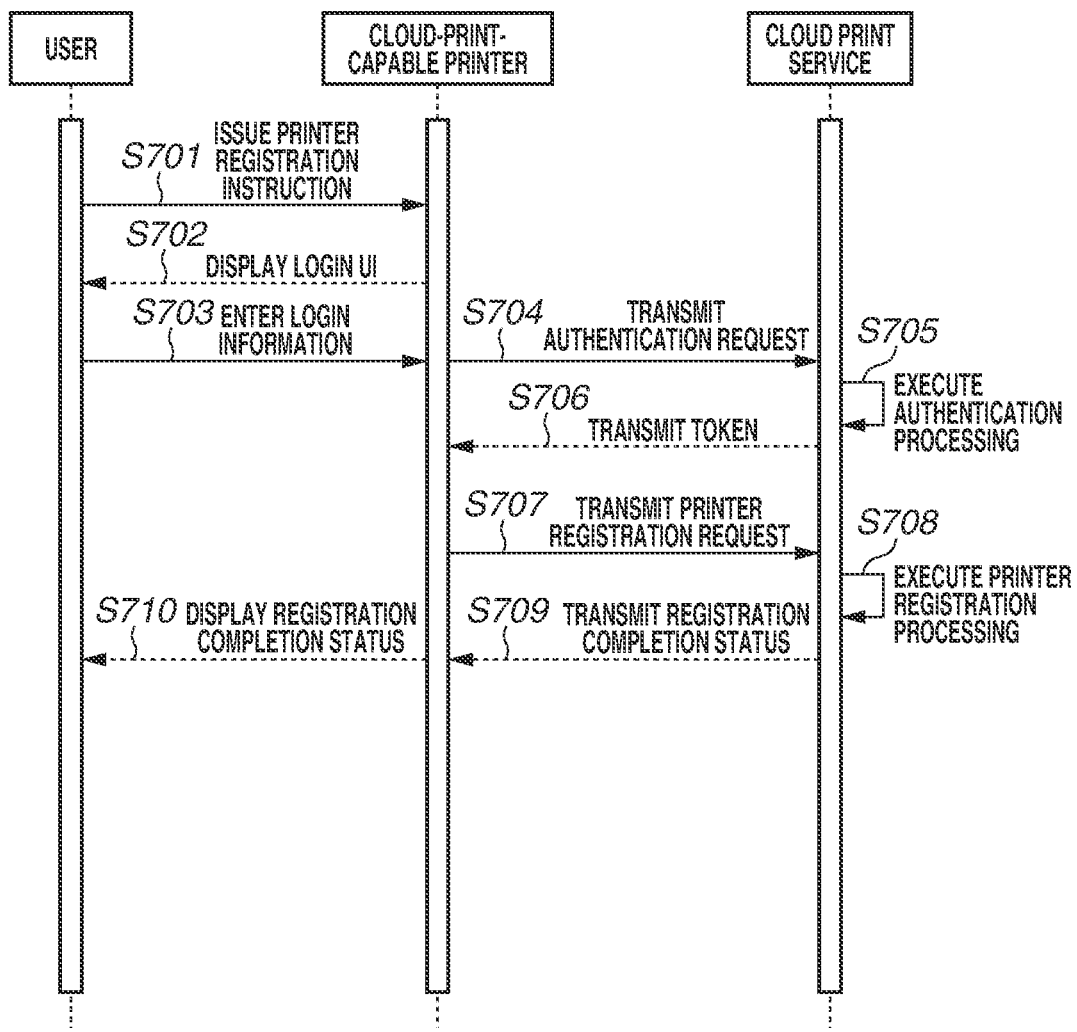
FIGS. 7A and 7B are sequence diagrams illustrating processing for registering printer information into a cloud print service according to an exemplary embodiment described in this specification.
Figure 7B:
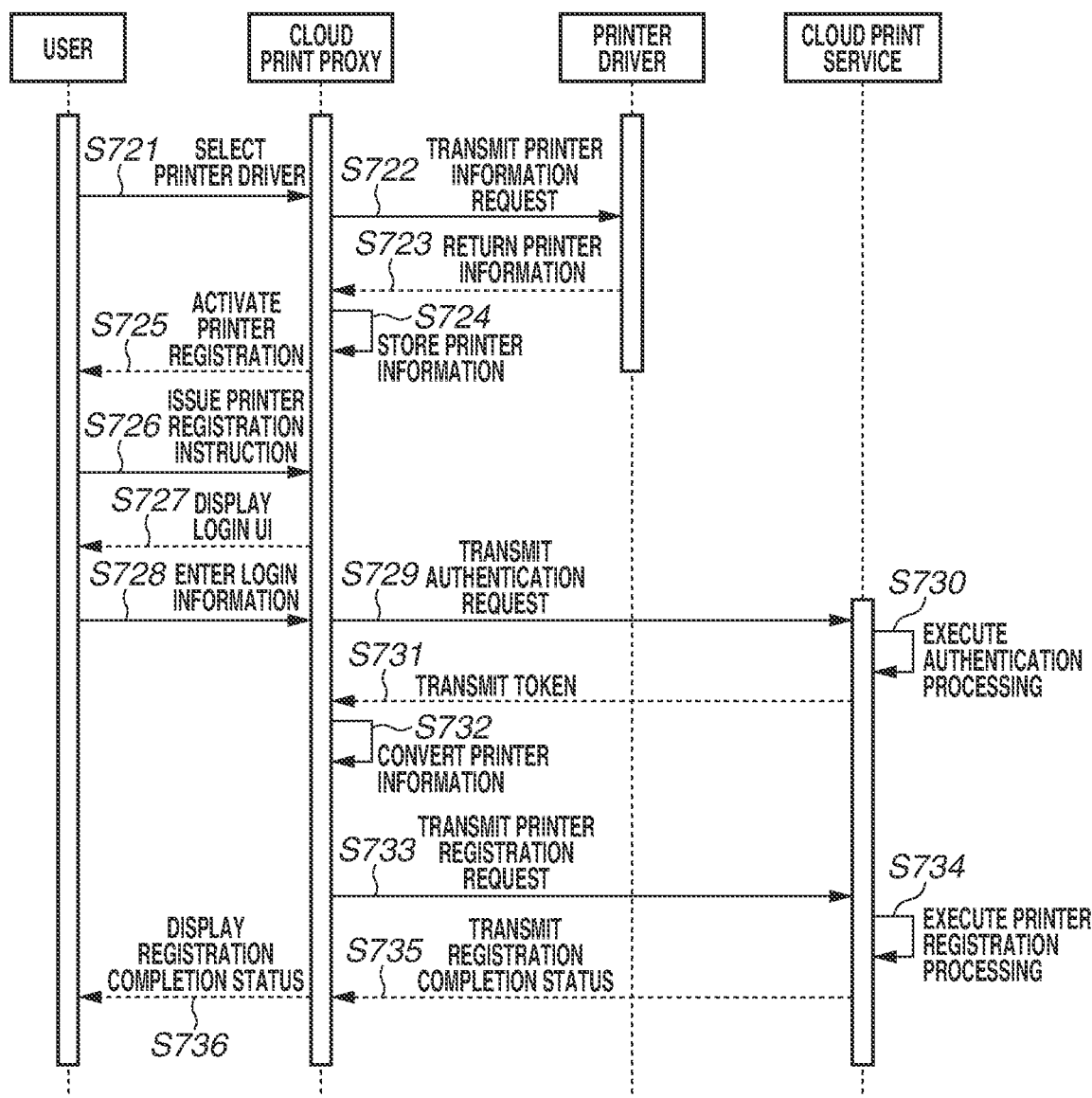

FIG. 8 is a flowchart illustrating an example of the printer registration processing that is executed by the cloud print service 321 in step S708 of FIG. 7A or in step S734 of FIG. 7B.

The processing illustrated in FIG. 8 is implemented by a program, of the cloud print service 321, that is stored in the auxiliary storage unit 224 of the cloud print server 102, being loaded onto the memory 223 and executed by the CPU 222.

The processing illustrated in FIG. 8 is started in response to the cloud print service 321 receiving a printer registration request from the outside via the network 106.

In step S801, the device management unit 32102 of the cloud print service 321 receives a printer registration request. The printer registration request includes the device information illustrated in FIG. 6E, or the interconversion information illustrated in FIG. 6C. The device management unit 32102 generates the device information illustrated in FIG. 6A, based on the received device information or the received interconversion information, and a tenant ID corresponding to a login user. In other words, in step S801, the cloud print service 321 acquires constraint information of a printer from the cloud-print-capable printer 104 or the cloud print proxy 331.

Figure 13A:
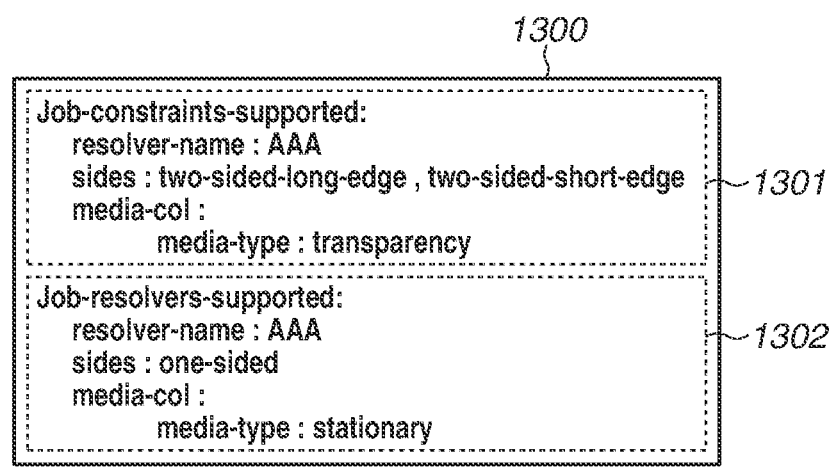

The constraint information received by the cloud print service 321 will now be described. In the case of a registration request from the cloud-print-capable printer 104, similar to the request in step S707 of FIG. 7A, the device management unit 32102 of the cloud print service 321 receives constraint information held in the cloud-print-capable printer 104. FIG. 13A illustrates an example of constraint information held in the cloud-print-capable printer 104 according to the present exemplary embodiment. Data 1300 is described in the format of IPP. Constraint information includes Job-constraints-supported 1301 and Job-resolvers-supported 1302. The Job-constraints-supported 1301 and the Job-resolvers-supported 1302 have a common resolver name.

For example, the Job-constraints-supported 1301 is constraint information with a resolver name "AAA". The constraint information defines that a setting values of "long-edge binding" or "short-edge binding" of two-sided printing and a setting value of a sheet type "transparency" become conflicts with each other.

The Job-resolvers-supported 1302 indicates a setting value with which the conflict in the constraint information with the resolver name "AAA" is to be resolved.

The Job-resolvers-supported 1302 defines that the two-sided printing setting is to be changed to "one-sided", and the sheet type is to be changed to "stationary" indicating plain paper, in a case where the print setting defined in the constraint information with the resolver name "AAA" is set. While, in the present exemplary embodiment, constraint information defined by the IPP has been described, constraint information receivable by the device management unit 32102 of the cloud print service 321 is not limited to setting items and setting values defined by the IPP.

On the other hand, in the case of a registration request from the cloud print proxy 331 as in step S733 of FIG. 7B, a printer and a printer driver may not include constraint information in an IPP format as illustrated in FIG. 13A. Thus, the cloud print proxy 331 converts a set of a print ticket and print capabilities that is held in the printer driver 332, into a format interpretable by the cloud print service 321, and registers the converted set into the cloud print service 321 as constraint information. A print ticket corresponds to data describing a set of print settings. The print capabilities correspond to data describing information indicating whether a setting value of each print setting conflicts with the set of print settings described in a print ticket. In the present exemplary embodiment, the printer driver stores print tickets corresponding to several representative print settings, and print capabilities each corresponding to a different one of the print tickets.

FIG. 13B is a diagram illustrating Print Capabilities 1350 corresponding to one print ticket held by the printer driver 332. A region 1351 describes settings of two-sided printing, and indicates that three setting values of "NOT APPLY", "LONG-EDGE BINDING", and "SHORT-EDGE BINDING" are set to two-sided printing. A part of "constrained" in each of the setting values indicates whether a corresponding setting value conflicts with a setting value of a different setting item.

In the region 1351, all parts of "constrained" indicate "None". That is, it is indicated that none of the setting values conflicts with a setting value of a different setting item. In a case where any of the setting values conflicts with a setting value of a different setting item described in a print ticket, a value indicated in the part of "constrained" becomes the "print ticket settings".

The Print Capabilities 1350 are described in a format of an Extensible Markup Language (XML), and describe selling items settable in the non-cloud-print-capable printer 105, and options of the setting items. A region 1352 indicates options of a sheet type. While, in the present exemplary embodiment, print capabilities have been described, any information may be used as long as the information can be used for constraint processing.

In step S802, the print queue management unit 32104 generates a print queue based on the generated device information.

Next, in step S803, the print queue management unit 32104 generates the print queue information illustrated in FIG. 6B. In a case where information received together with the registration request is the device information illustrated in FIG. 6E, a printer name is set as a print queue name. In a case where information received together with the registration request is the interconversion information illustrated in FIG. 6C, a print queue name in the interconversion information is set as a print queue name to be generated.

In step S804, the print queue management unit 32104 determines whether the received registration request is a registration request from the cloud-print-capable printer 104. In step S804, the print queue management unit 32104 performs the determination based on whether the information received together with the registration request includes a proxy ID. Whether the received information includes a proxy ID is determined based on a character string included in the received information. In a case where the received information includes a specific character string, the print queue management unit 32104 determines that the information is acquired from the cloud print proxy server 103. On the other hand, in a case where the received information does not include a specific character string, the print queue management unit 32104 determines that the information is acquired from the cloud-print-capable printer 104. In the determination in step S804, it is sufficient that determination of whether a printer that has transmitted a registration request is a cloud-print-capable printer or a non-cloud-print-capable printer connected via a proxy server is performed, and a determination method is not limited to the above-described method.

In a case where the received registration request is a registration request transmitted from the cloud-print-capable printer 104 (YES in step S804), the processing proceeds to step S805. In step S805, the print queue management unit 32104 sets information indicating "printer direct connection", as a printer connection configuration in print queue information.

On the other hand, in a case where the received registration request is a registration request transmitted from the non-cloud-print-capable printer 105 (NO in step S804), the processing proceeds to step S806. In step S806, the print queue management unit 32104 sets information indicating "connection via cloud print proxy", as a printer connection configuration in print queue information.

After the above-described processing, the cloud print service 321 ends the printer registration processing illustrated in FIG. 8.

FIG. 9 is a diagram illustrating an example of a sequence of processing related to print setting and print processing according to the present exemplary embodiment. FIG. 9 illustrates a sequence of processing that is performed in a case where the Cloud-print-capable printer 104 is used.

In step S901, the user issues a display instruction of a print setting screen by using an application. The cloud print driver 311 receives the display instruction of a print setting screen via the application.

In step S902, the cloud print driver 311 displays the print setting screen 400.

In step S903, the user operates the region 401 of the print setting screen 400, and selects a print queue corresponding to a printer to be used in printing.

In step S904, the cloud print driver 311 updates the print setting screen 400 referring to information regarding the selected print queue.

In step S905, the user operates the print setting screen 400 and issues a start-up instruction of the print setting extension application 312. In response to the user selecting the advanced setting button 406 on the print setting screen 400, in step S906, the cloud print driver 311 receives the start-up instruction of the print setting extension application 312.

In step S907, after initialization processing, the print setting extension application 312 displays the extended print setting screen 500 illustrated in FIG. 5A.

In step S908, the user operates the print setting extension application 312 and changes a print setting.

In step S909, the print setting extension application 312 refers to constraint information to verify whether a print setting conflicting with a print setting set on a UI is described.

The print setting extension application 312 checks whether a conflict occurs. In a case where a conflict occurs, in step S910, the print setting extension application 312 displays a print setting in a state in which the conflict is resolved, on the extended print setting screen 500. In a case where a conflict does not occur, the print setting extension application 312 does not change the display.

In a case where the print setting displayed on the extended print setting screen 500 is to be determined, in step S911, the user selects the "OK" button 506 on the extended print setting screen 500. In step S912, the print setting extension application 312 ends the application as necessary.

In step S913, the print setting extension application 312 transmits the determined print setting to the cloud print driver 311. The cloud print driver 311 displays again the print setting screen 400 illustrated in FIG. 4. In step S914, the user operates the print setting screen 400 and presses the print button 407. In step S915, the cloud print driver 311 generates print data based on the print setting received from the print setting extension application 312, and transmits the print data to the cloud print service 321. In step S915, the cloud print driver 311 generates print data that is based on a print setting described in accordance with the IPP, and image data in a predetermined format, such as the PDF or PWG-Raster. Then, the cloud print driver 311 transmits the generated print data to the cloud print service 321, The cloud print service 321 stores received print data in association with a designated print queue.

In step S916, the cloud-print-capable printer 104 transmits an acquisition request of print data to the cloud print service 321. The acquisition request may be transmitted by polling processing performed every constant time, or the transmission of the acquisition request may be triggered by the login of the user into the cloud-print-capable printer 104.

In step S917, the cloud print service 321 transmits the print data stored in association with the print queue, to the cloud-print-capable printer 104. In step S918, the cloud-print-capable printer 104 prints an image that is based on the received print data.

After that, in step S919, the cloud-print-capable printer 104 notifies the cloud print service 321 of printing completion.

The above-described sequence is a sequence from a print setting up to the execution of printing using the cloud-print-capable printer 104.

Next, a sequence of printing that is executed using the non-cloud-print-capable printer 105 will be described with reference to FIG. 10.

Because steps S1001 to S1015 are the same as steps S901 to S915 of FIG. 9, the redundant description will be omitted.

In step S1016, the cloud print proxy 331 periodically transmits an acquisition request of print data to the cloud print service 321.

The cloud print service 321 refers to print queue information and determines whether a transmission source of a print data acquisition request is the cloud-print-capable printer 104 or the cloud print proxy 331. In a case where the cloud print service 321 determines that a transmission source of the print data acquisition request is the cloud print proxy 331, in step S1017, the cloud print service 321 performs conversion processing of the print data. The cloud print service 321 converts image data in a PDF format into data of an XML Paper Specification (XPS) format by converting a print setting written in accordance with the IPP, into a print ticket, for example.

Then, in step S1018, the cloud print service 321 transmits the print data obtained by the conversion in step S1017, to the cloud print proxy 331. In the present exemplary embodiment, the cloud print service 321 converts a format of print data into a format manageable by the printer driver 332. The above-described conversion may be performed by the cloud print proxy 331. In this case, the cloud print service 321 transmits print data to the cloud print proxy 331 without performing the processing in step S1017. The cloud print proxy 331 executes processing equivalent to the processing in step S1017, on the received print data.

In step S1019, the cloud print proxy 331 transmits the received print data to the printer driver 332.

In step S1020, the printer driver 332 executes conversion processing of converting the received print data into rendering data processable by the non-cloud-print-capable printer 105. In step S1020, the printer driver 332 generates PDL data based on the print ticket (data in an XPS format) received from the cloud print proxy 331, for example.

In step S1021, the printer driver 332 transmits the generated rendering data to the non-cloud-print-capable printer 105.

In step S1022, the non-cloud-print-capable printer 105 executes printing based on the received rendering data.

Next, processing that is performed by the print setting extension application 312 when a print setting is changed and determined will be described with reference to FIG. 11. FIG. 11 illustrates a flow of processing corresponding to steps S906 to S915 of FIG. 9, or steps S1006 to S1015 of FIG. 10, and the processing is started in response to the advanced setting button 406 being selected on the print setting screen 400 illustrated in FIG. 4.

All of the processing illustrated in FIG. 11 is implemented by a program of the print setting extension application 312 that is stored in the auxiliary storage unit 214 of the client terminal 101, being loaded onto the memory 213 and executed by the CPU 212.

In step S1101, the print setting extension application 312 displays the extended print setting screen 500 illustrated in FIG. 5A. Then, in step S1102, the print setting extension application 312 receives an operation for a print setting from the user. In step S1103, the print setting extension application 312 determines whether the "OK" button 506 for determining a print setting has been selected by the user. In a case where it is determined in step S1103 that the "OK" button 506 has been selected (YES in step S1103), the processing proceeds to step S1104. In step S1104, the print setting extension application 312 determines the print setting and notifies the cloud print driver 311 of the print setting.

On the other hand, in a case where it is determined in step S1103 that the "OK" button 506 for determining a print setting is not selected (NO in step S1103), the print setting extension application 312 advances the processing to step S1105.

In step S1105, the print setting extension application 312 determines whether a print setting on the extended print setting screen 500 has been changed. In a case where it is determined in step S1105 that a print setting has not been changed (NO in step S1105), the processing returns to step S1102, and an operation for a print setting is received from the user.

On the other hand, in a case where it is determined in step S1105 that a print setting on the extended print setting screen 500 has been changed (YES in step S1105), the print setting extension application 312 advances the processing to step S1106.

In step S1106, the print setting extension application 312 determines whether constraint information has already been acquired from the print queue management unit 32104 of the cloud print service 321. While, in the present exemplary embodiment, the determination is performed by determining whether constraint information acquired from the print queue management unit 32104 exists in the auxiliary storage unit 214 the client terminal 101, any determination method may be used as long as it can be determined that constraint information has been acquired from the print queue management unit 32104.

In a case where it is determined in step S1106 that constraint information has not been acquired yet (NO in step S1106), the processing proceeds to step S1107. In step S1107, constraint information is acquired from the cloud print service 321, and the acquired constraint information is stored into a region prepared in the auxiliary storage unit 214 of the client terminal 101.

On the other hand, in a case where it is determined in step S1106 that constraint information has already been acquired from the cloud print service 321 (YES in step S1106), the print setting extension application 312 advances the processing to step S1108.

In step S1108, the constraint processing unit 31206 of the print setting extension application 312 executes constraint processing based on the constraint information. The details of the processing in step S1108 will be described below with reference to FIG. 16.

After that, the print setting extension application 312 returns the processing to step S1102.

The details of the processing in step S1108 of FIG. 11 will be described with reference to FIG. 16.

In step S1601, the print setting extension application 312 determines whether the selected print queue is a print queue of the cloud-print-capable printer 104. In a case where the selected print queue is a print queue of the cloud-print-capable printer 104 (YES in step S1601), the print setting extension application 312 advances the processing to step S1602. The print setting extension application 312 determines whether the selected print queue is a print queue of the cloud-print-capable printer 104, based on the information set in step S805 or S806 of FIG. 8.

In step S1602, the print setting extension application 312 selects one constraint from the constraint information acquired from the cloud print service 321. For example, the print setting extension application 312 selects a constraint with the resolver name "AAA" as illustrated in FIG. 13A.

In step S1603, the print setting extension application 312 determines whether a set print setting includes a print setting matching the selected constraint. For example, in a case where the setting of two-sided printing is set to "APPLY (LONG-EDGE BINDING)" and the sheet type is set to "TRANSPARENCY" as illustrated in FIG. 5B, the print setting extension application 312 determines that a print setting matching the constraint of the resolver name "AAA" is included.

In a case where a print setting matching the selected constraint is not included (NO in step S1603), the print setting extension application 312 advances the processing to step S1605.

In a case where a print setting matching the selected constraint is included (YES in step S1603), the print setting extension application 312 advances the processing to step S1604. In step S1604, the print setting extension application 312 changes a setting value of the print setting. Based on the Job-resolvers-supported illustrated in FIG. 13A, the print setting extension application 312 changes the setting of two-sided printing to "one-sided" printing and changes the sheet type to "stationary" indicating plain paper. The print setting extension application 312 displays the changed setting values on a print setting screen as illustrated in FIG. 5C. In addition to changing setting values, setting items of which setting values have been changed may be displayed on the print setting screen and notified to the user.

In step S1605, the print setting extension application 312 determines whether a constraint of which inclusion in a print setting has not been checked remains. In a case where a constraint unused in determination remains (YES in step S1605), the print setting extension application 312 returns the processing to step S1602. In a case where a constraint unused in determination does not remain (NO in step S1605), the print setting extension application 312 ends the flow illustrated in FIG. 16.

In a case where it is determined in step S1601 that the selected print queue is not a print queue of the cloud-print-capable printer 104 (NO in step S1601), the print setting extension application 312 advances the processing to step S1606. In this case, the selected print queue is a print queue of a printer that executes printing via a cloud print proxy.

In step S1606, the print setting extension application 312 determines whether information regarding a print ticket matching the current print setting set on the print setting screen is stored. In a case where such a print ticket is not stored (NO in step S1606), this flow is ended. In a case where a print ticket matching the current print setting is stored (YES in step S1606), the print setting extension application 312 executes the processing in step S1607.

In step S1607, the print setting extension application 312 determines whether conflicting setting items are included, by referring to the print ticket matching the set print setting and print capabilities corresponding to the print ticket. The print setting extension application 312 refers to constraint values in the print capabilities, for setting values set in the print ticket. In a case where the print ticket has a setting item having a setting value matching a constraint value (YES in step S1607), the print setting extension application 312 advances the processing to step S1608. In a case where the print ticket has no setting item having a value matching a constraint value (NO in step S1607), the print setting extension application 312 ends the processing illustrated in FIG. 16.

Referring to the print capabilities, the print setting extension application 312 changes a setting value, of a setting item of the print ticket, matching a constraint value to a setting value at which the setting value no longer matches a constraint value. After changing the setting values, the print setting extension application 312 returns the processing to step S1606. In step S1608, the print setting extension application 312 displays the changed setting values on the print setting screen, and notifies the user of setting items of which setting values have been changed.

Figure 16:
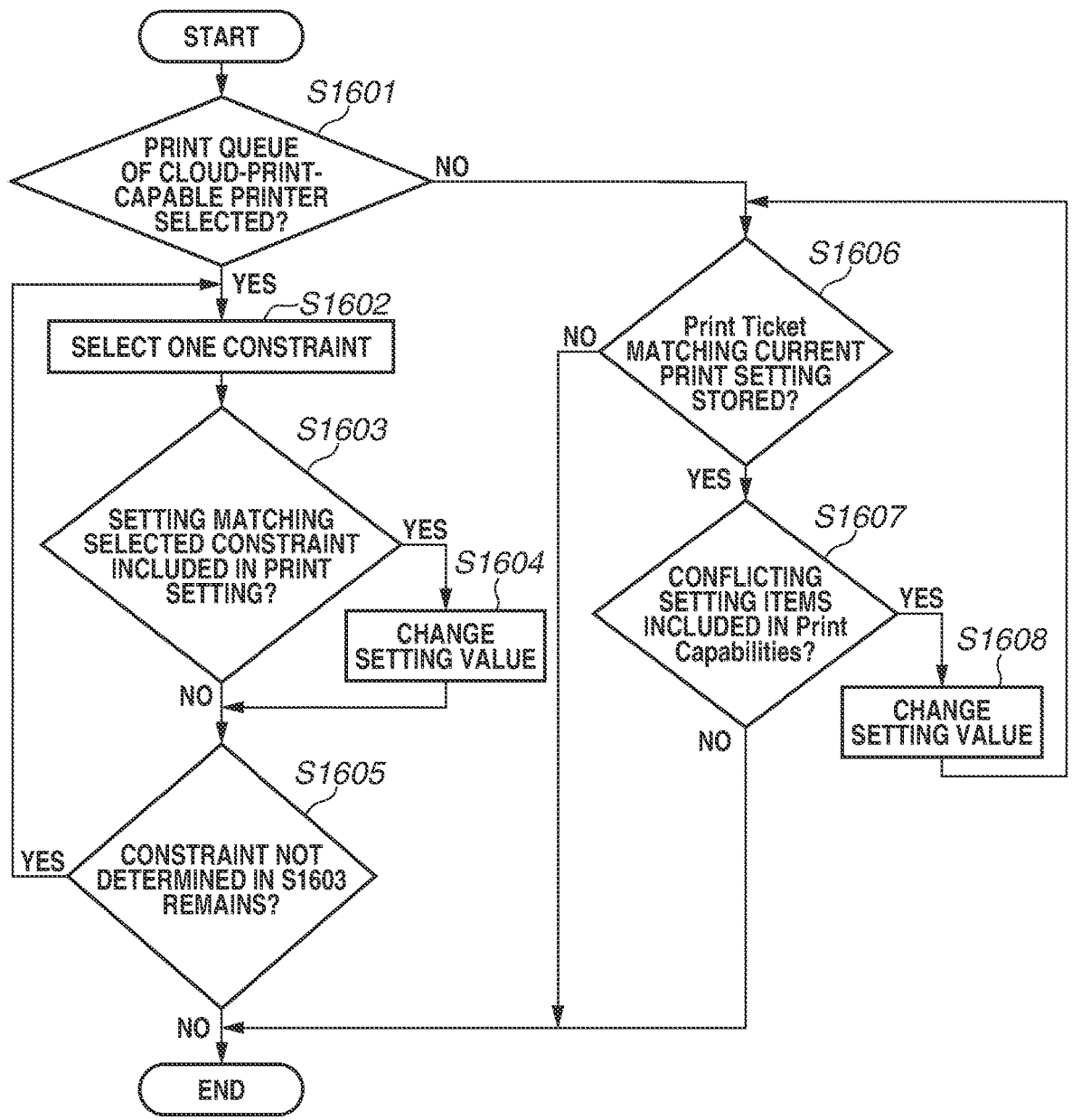
FIG. 16 is a flowchart illustrating an example of processing for determining whether a print setting includes conflicting print settings, according to an exemplary embodiment described in this specification.

It has been described that, in steps S1604 and S1608 of FIG. 16, a setting value of a print setting is changed to avoid a conflict between the setting value of the print setting and a constraint. A setting item matching a constraint may be displayed on a print setting screen and notified to the user without changing a setting value. In this case, a conflict between setting values is resolved by the user changing a setting value of a setting item that has been notified as a setting item matching a constraint.

In the present exemplary embodiment, the print setting extension application 312 acquires constraint information from the cloud print service 321, and the constraint processing unit 31206 of the print setting extension application 312 executes constraint processing. As a matter of course, the cloud print driver 311 may acquire constraint information from the cloud print service 321, and the constraint processing unit 31105 of the cloud print driver 311 may execute constraint processing.

Through the above-described procedure, the print setting extension application 312 acquires constraint information from the cloud print service 321, and performs constraint processing based on the acquired constraint information. With this configuration, it is possible to prevent a print job from including a combination of setting values matching a constraint in a case where a printer driver for a cloud print service is used. Since a client terminal acquires and stores constraint information, in a case where a print setting is changed, it can be determined whether a setting matching a constraint is included, without performing an inquiry of an external server.

In the first exemplary embodiment, the print setting extension application 312 acquires constraint information from the cloud print service 321. In the first exemplary embodiment, in a case where constraint information cannot be acquired from the cloud print service 321, a conflict between print settings cannot be verified.

In view of the foregoing, in a second exemplary embodiment, the print setting extension application 312 originally holds constraint information common to models, and verifies print settings using the held constraint information in a case where constraint information cannot be acquired from the cloud print service 321. With this configuration, even in a case where constraint information cannot be acquired from the cloud print service 321, verification can be performed based on constraint information.

Constraint information common to models according to the present exemplary embodiment is constraint information limited to functions expected to be included in all printers of a vendor that provides a print setting extension application. By the print setting extension application 312 including constraint information common to models, in a case where constraint information cannot be acquired from the cloud print service 321, it can be determined whether a setting matching a constraint is performed at least for functions common to all models.

Processing according to the present exemplary embodiment will be described with reference to a flowchart in FIG. 12.

Figure 12:
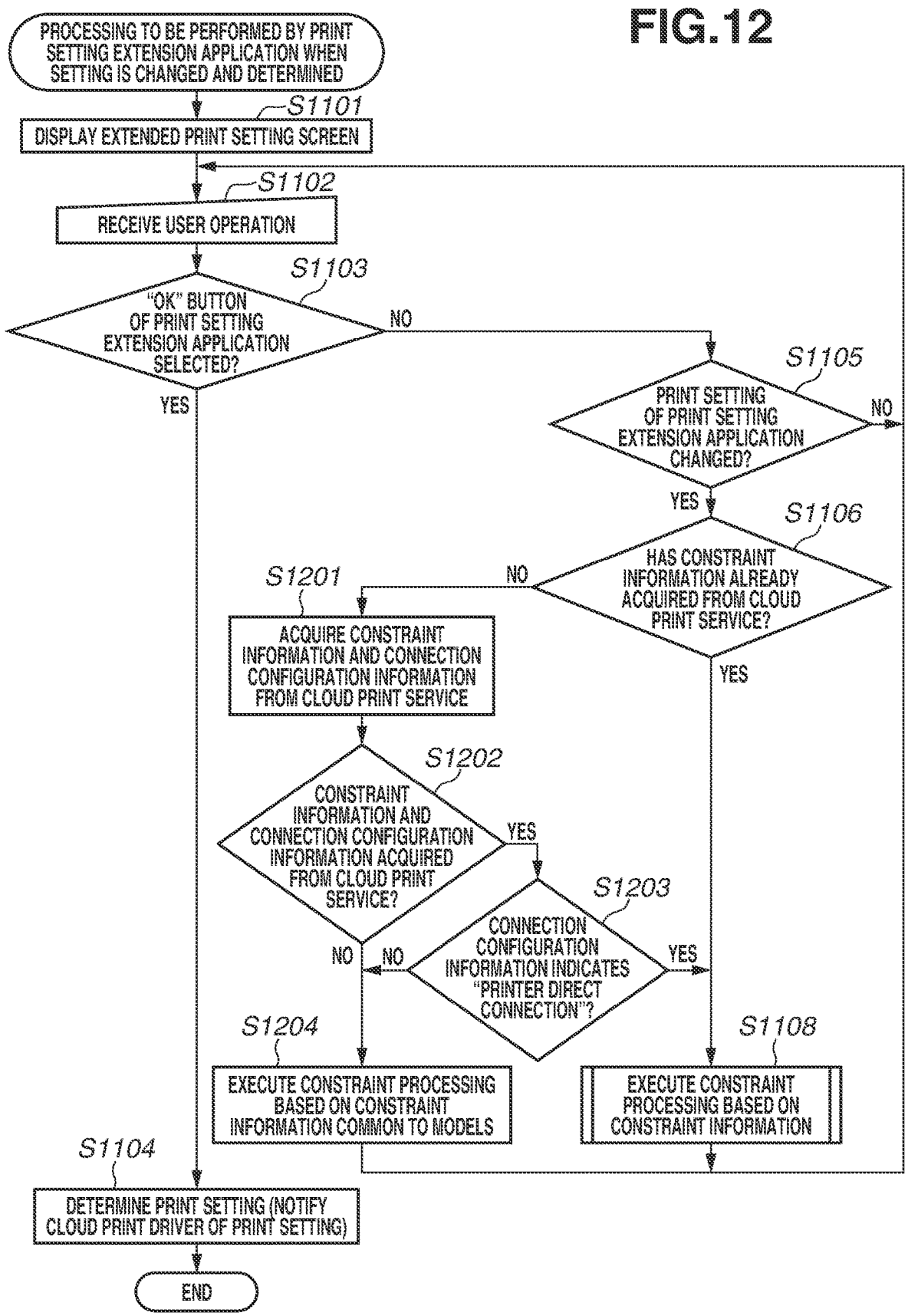
FIG. 12 is a flowchart illustrating processing that is performed by a print setting extension application when a print setting is changed and determined according to a second exemplary embodiment described in this specification.

All of the processing illustrated in FIG. 12 is implemented by a program of the print setting extension application 312 that is stored in the auxiliary storage unit 214 of the client terminal 101, being loaded onto the memory 213 and executed by the CPU 212.

In FIG. 12, processing similar to the processing in the first exemplary embodiment is assigned the same step number as that in FIG. 11 and the redundant description will be omitted.

In a case where it is determined in step S1106 that constraint information has not been acquired from the punt queue management unit 32104 of the cloud print service 321 (NO in step S1106), the print setting extension application 312 advances the processing to step S1201. In step S1201, the print setting extension application 312 acquires constraint information and connection configuration information from the print queue management unit 32104. The connection configuration information is information set by the cloud print service 321 in step S805 or S806 of FIG. 8.

In step S1202, the print setting extension application 312 determines whether constraint information and the connection configuration information have been acquired from the print queue management unit 32104. In a case where constraint information and connection configuration information have been acquired, the print setting extension application 312 stores the acquired constraint information in a region prepared in the auxiliary storage unit 214 of the client terminal 101.

In a case where it is determined in step S1202 that constraint information has not been acquired from the print queue management unit 32104 (NO in step S1202), the print setting extension application 312 advances the processing to step S1204. In step S1204, the print setting extension application 312 performs constraint processing based on constraint information common to models that is prestored in the print setting extension application 312. The constraint information common to models according to the present exemplary embodiment is constraint information independent of the type of a printer, such as the cloud-print-capable printer 104 or the non-cloud-print-capable printer 105, and is stored in the auxiliary storage unit 214 of the client terminal 101.

On the other hand, in a case where it is determined in step S1202 that constraint information has been acquired from the print queue management unit 32104 of the cloud print service 321 (YES in step S1202), the print setting extension application 312 advances the processing to step S1203.

In step S1203, the print setting extension application 312 determines whether the connection configuration information acquired from the print queue management unit 32104 indicates "printer direct connection". In a case where the print setting extension application 312 determines that the connection configuration information indicates "printer direct connection" (YES in step S1203), the print setting extension application 312 advances the processing to step S1108.

On the other hand, in a case where it is determined in step S1203 that the acquired connection configuration information does not indicate "printer direct connection" (NO in step S1203), the print setting extension application 312 advances the processing to step S1204, The processing in step S1204 is similar to the processing in step S1602 to S1605 of FIG. 16. The print setting extension application 312 selects one constraint from constraint information common to models, and performs processing of determining whether a print setting matching the selected constraint is included, on all constraints.

In the present exemplary embodiment, the print setting extension application 312 acquires constraint information from the cloud print service 321, and the constraint processing unit 31206 of the print setting extension application 312 executes constraint processing. The cloud print driver 311 may acquire constraint information from the cloud print service 321, and the constraint processing unit 31105 of the cloud print driver 311 may execute constraint processing. As a matter of course, the cloud print driver 311 may originally hold constraint information common to models.

Through the above-described procedure, in a case where constraint information has not been acquired from the cloud print service 321, the print setting extension application 312 performs constraint processing based on constraint information common to models that is originally held by the print setting extension application 312.

With this configuration, even in a case Where constraint information has not been acquired from the cloud print service 321, the print setting extension application 312 can perform constraint processing common to models.

In the second exemplary embodiment, the print setting extension application 312 prestores constraint information common to models.

In a third exemplary embodiment, processing that is performed in a case where the print setting extension application 312 prestores constraint information which is equivalent to constraint information of the cloud print service 321 will be described. In the present exemplary embodiment, the print setting extension application 312 stores, as constraint information, constraints of setting values of all setting items settable by the print setting extension application 312. In this case, constraint information needs not be registered into the cloud print service 321 in step S707 of FIG. 7A and step S733 of FIG. 7B.

Figure 10:
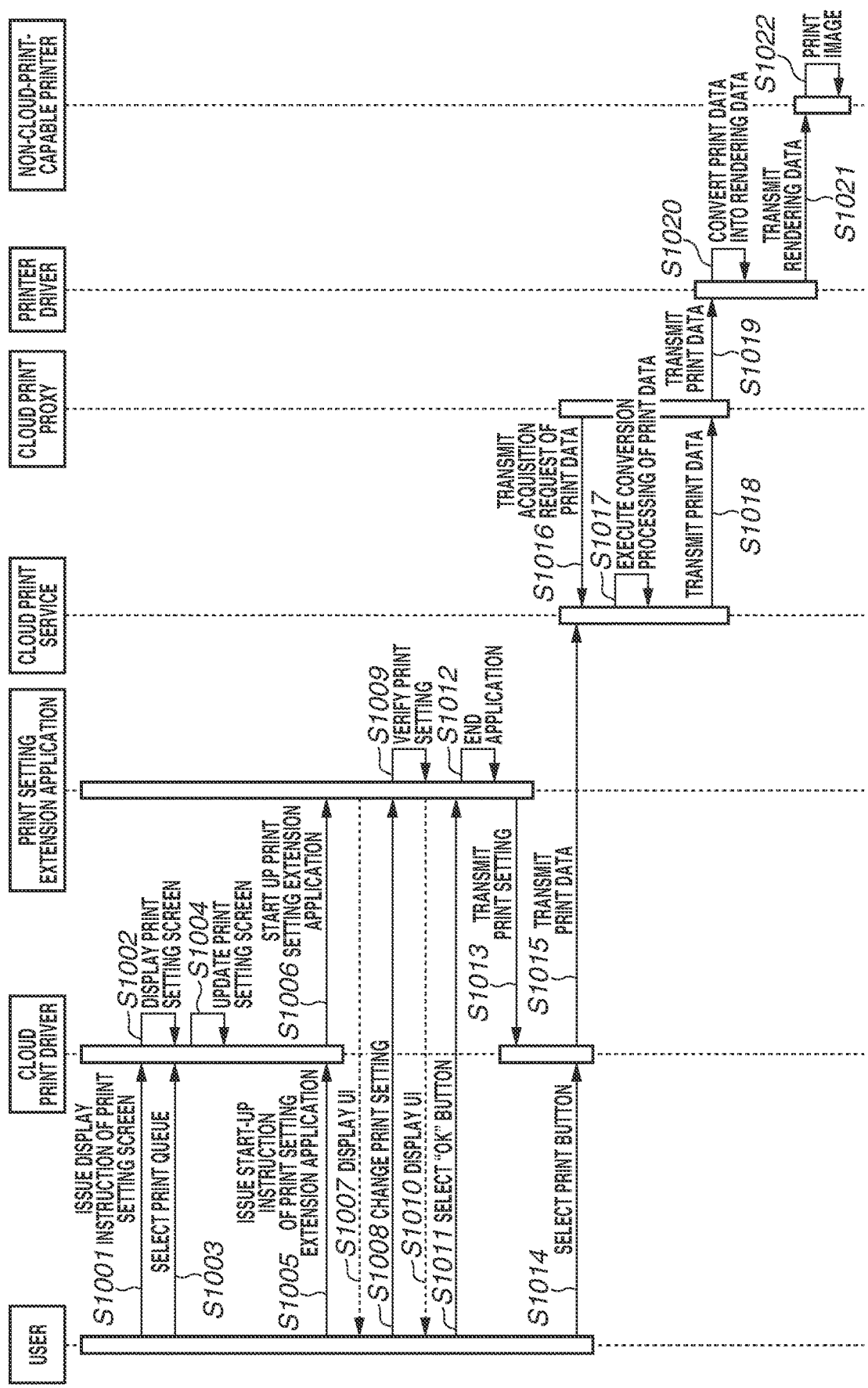
FIG. 10 is a sequence diagram illustrating processing up to execution of printing using a non-cloud-print-capable printer, according to an exemplary embodiment described in this specification.
Figure 11:
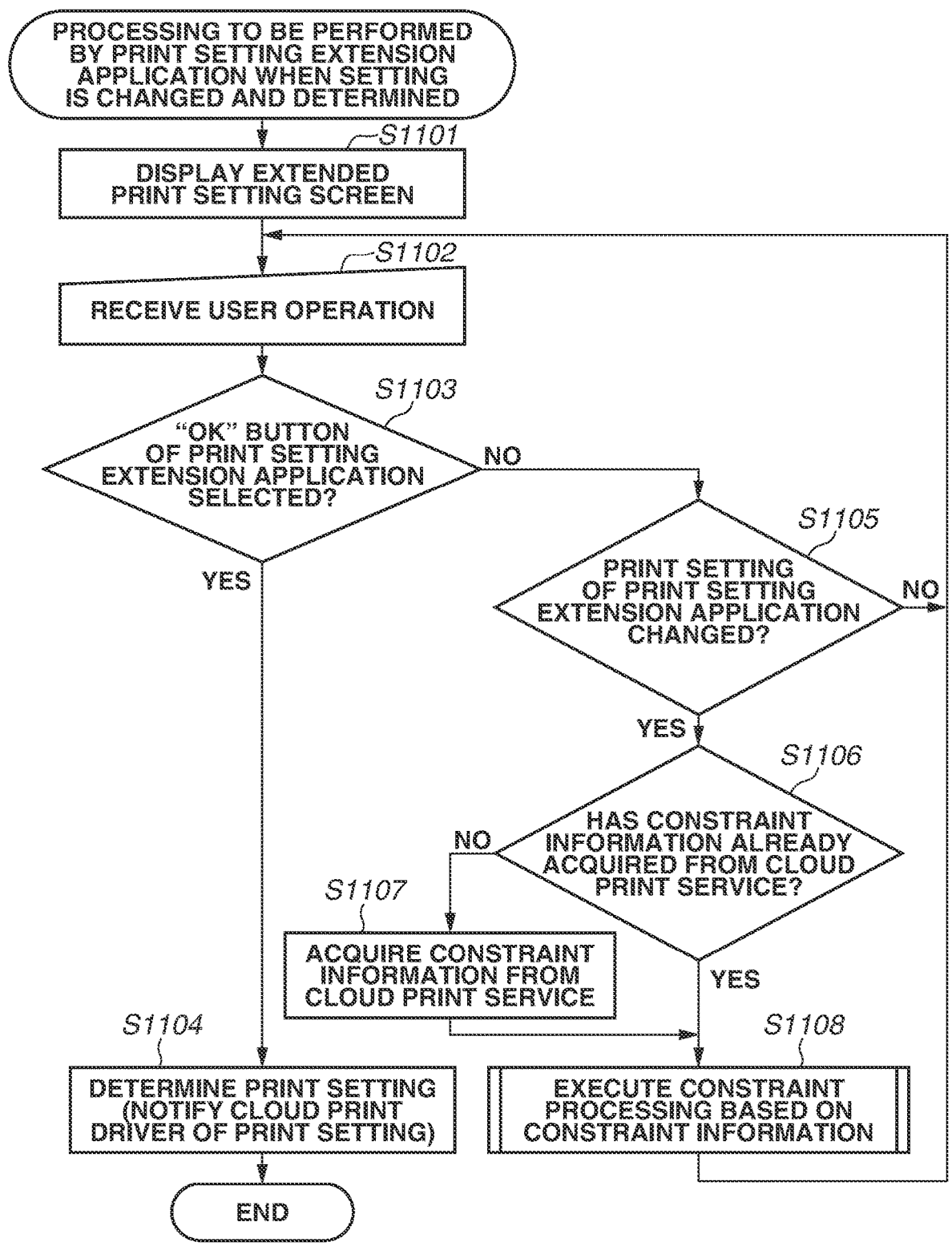
FIG. 11 is a flowchart illustrating processing that is performed by a print setting extension application when a print setting is changed and determined, according to a first exemplary embodiment described in this specification.

The print setting extension application 312 is installed onto the client terminal 101 at a timing of when the user generates a print queue of a printer registered in the cloud print service 321 after the printer registration processing illustrated in FIG. 9 or 10 is completed. In the present exemplary embodiment, because the print setting extension application 312 stores constraint information, the constraint information is also stored in the client terminal 101 at the above-described timing. The print setting extension application 312 is installed from a server for application distribution, and acquired from a server different from a server to which the client terminal 101 transmits print data. In other words, the constraint information is also acquired from a server different from a server serving as a transmission destination of print data.

Processing that is performed by the print setting extension application 312 according to the present exemplary embodiment will be described with reference to a flowchart illustrated in FIG. 14.

Figure 14:
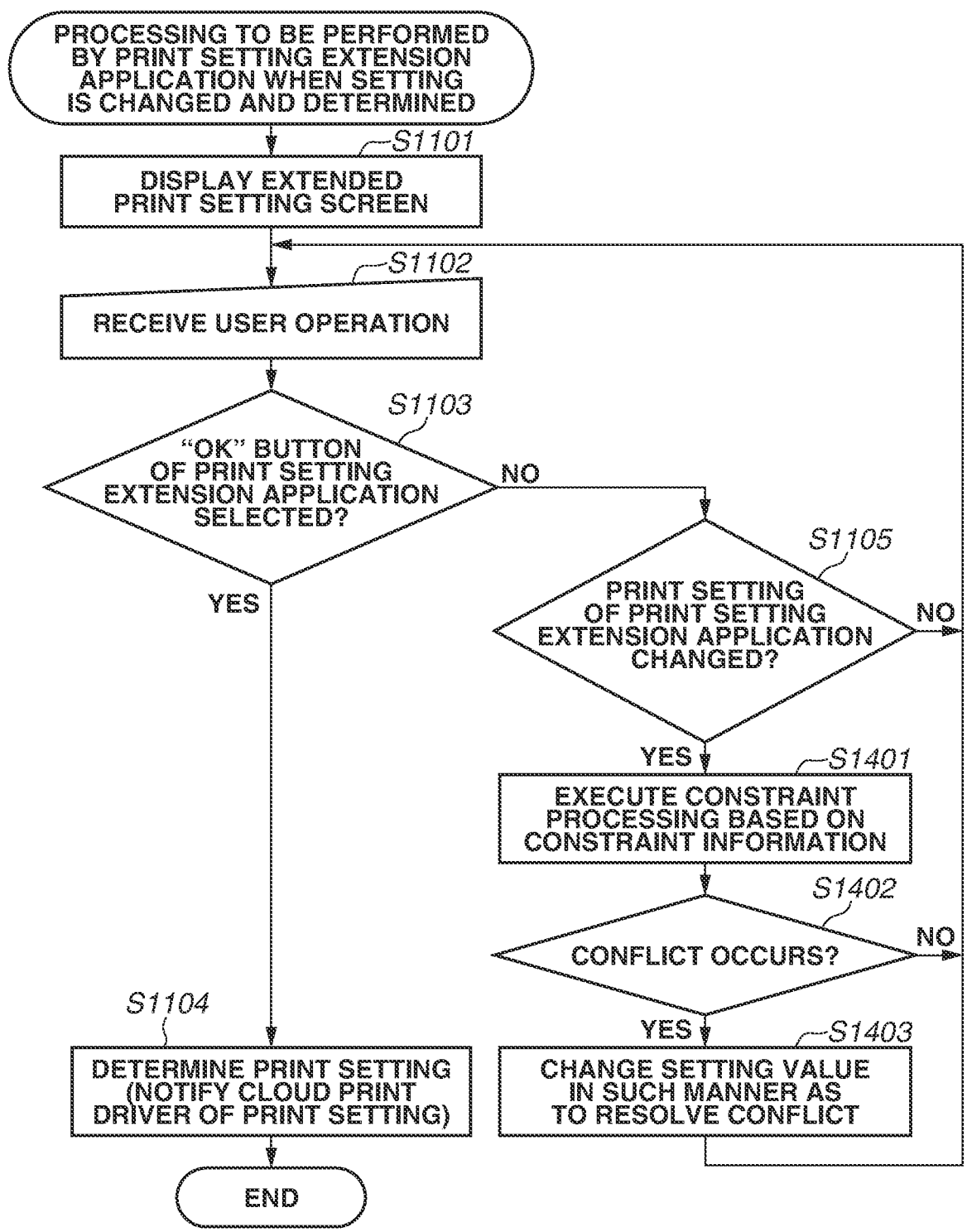
FIG. 14 is a flowchart illustrating processing that is performed by a print selling extension application when a print setting is changed and determined, according to a third exemplary embodiment described in this specification.

All of the processing illustrated in FIG. 14 is implemented by a program of the print setting extension application 312 that is stored in the auxiliary storage unit 214 of the client terminal 101, being loaded onto the memory 213 and executed by the CPU 212. Processing similar to the processing illustrated in FIG. 11 is assigned the same step number as that in FIG. 11, and the redundant description will be omitted.

In a case where it is determined in step S1105 that a print setting on the extended print setting screen 500 has been changed (YES in step S1105), the print setting extension application 312 advances the processing to step S1401.

In step S1401, the constraint processing unit 31206 of the print setting extension application 312 performs constraint processing based on constraint information originally held by the print setting extension application 312. The constraint information according to the present exemplary embodiment is constraint information dependent on each printer, such as the cloud-print-capable printer 104 or the non-cloud-print-capable printer 105, and is stored in the auxiliary storage unit 214 of the client terminal 101.

In step S1402, the print setting extension application 312 determines whether a conflict occurs in a print setting currently set on the extended print setting screen 500. The print setting extension application 312 determines whether a currently-set print setting value includes a setting value matching a constraint included in the stored constraint information.

In a case where it is determined in step S1402 that a setting value matching a constraint is included, and a conflict between setting values occurs (YES in step S1402), the print setting extension application 312 advances the processing to step S1403. In step S1403, the print setting extension application 312 changes a setting value in such a manner that the conflict is resolved. In the present exemplary embodiment, in a case where the currently-set print setting value includes a setting value matching a constraint, a setting value is changed in such a manner that the conflict is resolved. The print setting extension application 312 may change the setting value, and further notify a setting item of which the setting value has been changed. The print setting extension application 312 may notify the user of a setting item of which setting values are in conflict, without changing a setting value.

On the other hand, in a case where it is determined in step S1402 that a setting value matching a constraint is not included, and a conflict between setting values does not occur (NO in step S1402), the print setting extension application 312 returns the processing to step S1102, and receives an operation for a print setting from the user.

Through the above-described procedure, the print setting extension application 312 can perform constraint processing based on originally-held constraint information.

In the above description, the print setting extension application 312 holds constraint information of all setting items settable by the application. If constraint information of at least part of setting items is held instead of constraint information of all setting items, it can be determined whether a conflict occurs among the part of setting items. With this configuration, it is possible to prevent the occurrence of a conflict among a plurality of setting values included in print data.

Figure 15:
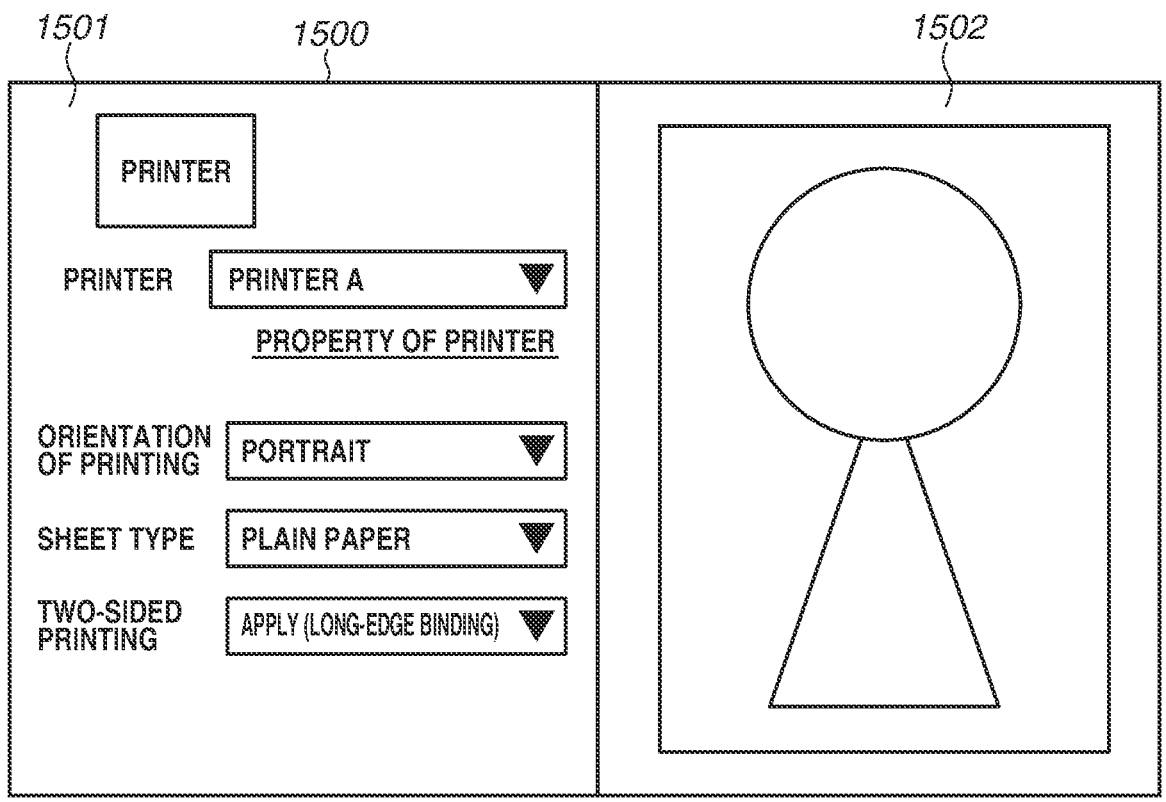
FIG. 15 is a diagram illustrating an example of a print setting screen in printing executed from an application, according to an exemplary embodiment described in this specification.

FIG. 15 illustrates a print setting screen 1500 in printing to be executed from a document editing application. The document editing application is stored in the auxiliary storage unit 214 of the client terminal 101. A program of the document editing application is loaded onto the memory 213 and executed by the CPU 212.

In a region 1501 illustrated in FIG. 15, a printer and a print setting are selectable, and in a region 1502, a preview of a document to be printed is displayed. The document editing application can apply constraint processing to the print setting selected in the region 1501, by calling up constraint information (Print Capabilities 1350) stored in the print setting extension application 312.

In all of the first to third exemplary embodiments, at a timing of when the user changes a setting value on the extended print setting screen displayed by the print setting extension application 312, it is determined whether a current print setting matches a constraint. Instead of determining, at a timing of when a setting value is changed, whether a current print setting matches a constraint, it may be determined, at a timing of when the user selects the "OK" button 506 illustrated in FIG. 5A, whether a currently-set setting value matches a constraint. In this case, in a case where a currently-set setting value does not match a constraint, the print setting extension application 312 delivers the setting value to the cloud print driver 311. On the other hand, in a case where a currently-set print setting includes a setting value matching a constraint, the print setting extension application 312 changes the setting value and notifies the user of the change in setting value. Alternatively, without changing the setting value, the print setting extension application 312 may notify the user that the setting value needs to be changed in order to avoid a conflict with a constraint.

An exemplary embodiment of the present invention is also implemented by executing the following processing. More specifically, the processing is processing of supplying software (program) for executing functions of the above-described exemplary embodiments, to a system or an apparatus via a network or various storage media, and a computer (or CPU, micro processing unit (MPU), etc.) of the system or the apparatus reading out and executing a program code. In this case, the computer program and a storage medium storing the computer program configure the present invention.

According to an exemplary embodiment of the present invention, in a case of performing printing using a cloud print service, it is possible to avoid a print setting matching a constraint.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-052906, filed Mar. 26, 2021, which is hereby incorporated by reference herein in its entirety.

What is claimed is:

1. An information processing apparatus that transmits print data to a server in which information regarding an image forming apparatus is registered in accordance with a registration request from the image forming apparatus, and includes an installed application that sets setting values included in the print data, the information processing apparatus comprising:
a controller including a processor, wherein the controller is configured to:
display a print setting screen provided by the installed application;
receive an instruction to set setting values of setting items, via the print setting screen;
determine, based on first information received from the server, whether the setting values set via the print setting screen include a set of setting values that conflict with each other in a case where the image forming apparatus supports a print service provided by the server; and
determine, based on second information provided by the installed application, whether the setting values set via the print setting screen include a set of setting values that conflict with each other in a case where the image forming apparatus does not support the print service.

2. The information processing apparatus according to claim 1, wherein the first information is information acquired by the server from the image forming apparatus.

3. The information processing apparatus according to claim 1, wherein the application is acquired from an external apparatus and installed onto the information processing apparatus.

4. The information processing apparatus according to claim 3, wherein the second information is acquired based on that the application including the second information is acquired from the external apparatus.

5. The information processing apparatus according to claim 1, wherein, in a case where the setting values set via the print setting screen include the set of setting values.

6. The information processing apparatus according to claim 1, wherein the controller is further configured to:
transmit a print job generated by the information processing apparatus, and wherein the print job includes setting values that do not include the set of setting values that conflict with each other.

7. The information processing apparatus according to claim 1, wherein a printer driver that is compatible with a plurality of printers of a plurality of printer vendors is installed onto the information processing apparatus, and the application is associated with the installed printer driver.

8. A non-transitory storage medium storing an application installed onto an information processing apparatus that transmits print data to a server in which information regarding an image forming apparatus is registered in accordance with a registration request from the image forming apparatus, wherein the application sets setting values included in the print data, the application causing the information processing apparatus to execute the following processing by the application being executed:

displaying a print setting screen provided by the installed application;

receiving an instruction to set setting values of setting items, via the print setting screen;

determining, based on first information received from the server, whether the setting values set via the print setting screen include a set of setting values that conflict with each other in a case where the image forming apparatus supports a print service provided by the server; and determining, based on second information provided by the installed application, whether the setting values set via the print setting screen include a set of setting values that conflict with each other in a case where the image forming apparatus does not support the print service.

9. The non-transitory storage medium according to claim 8, wherein the first information is information acquired by the server from the image forming apparatus.

10. The non-transitory storage medium according to claim 8, wherein the application is acquired from an external apparatus and installed onto the information processing apparatus.

11. The non-transitory storage medium according to claim 10, wherein the second information is acquired based on that the application including the second information is acquired from the external apparatus.

12. A control method of an information processing apparatus that transmits print data to a server in which information regarding an image forming apparatus is registered in accordance with a registration request from the image forming apparatus, and includes an installed application that sets setting values included in the print data, the control method comprising:

displaying a print setting screen provided by the installed application;

receiving an instruction to set setting values of setting items, via the print setting screen;

determining, based on first information received from the server, whether the setting values set via the print setting screen include a set of setting values that conflict with each other in a case where the image forming apparatus supports a print service provided by the server; and determining, based on second information provided by the installed application, whether the setting values set via the print setting screen include a set of setting values that conflict with each other in a case where the image forming apparatus does not support the print service.

13. The control method of the information processing apparatus according to claim 12, wherein the first information is information acquired by the server from the image forming apparatus.

14. The control method of the information processing apparatus according to claim 12, wherein the application is acquired from an external apparatus and installed onto the information processing apparatus.

15. The control method of the information processing apparatus according to claim 14, wherein the second information is acquired based on that the application including the second information is acquired from the external apparatus.

\* \* \* \* \*